(12) United States Patent
Choudhury et al.

(10) Patent No.: US 10,628,484 B2
(45) Date of Patent: Apr. 21, 2020

(54) VIBRATIONAL DEVICES AS SOUND SENSORS

(71) Applicant: The Board of Trustees of the University of Illinois, Urbana, IL (US)

(72) Inventors: Romit Roy Choudhury, Champaign, IL (US); Nirupam Roy, Urbana, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 51 days.

(21) Appl. No.: 15/981,016

(22) Filed: May 16, 2018

(65) Prior Publication Data

US 2018/0336274 A1   Nov. 22, 2018

Related U.S. Application Data

(60) Provisional application No. 62/507,256, filed on May 17, 2017.

(51) Int. Cl.
*G06F 16/683* (2019.01)
*H04R 1/28* (2006.01)
(Continued)

(52) U.S. Cl.
CPC .......... *G06F 16/683* (2019.01); *H02P 6/182* (2013.01); *H02P 25/034* (2016.02);
(Continued)

(58) Field of Classification Search
USPC .............................. 704/231, 230, 200, 1–504
See application file for complete search history.

(56) References Cited

U.S. PATENT DOCUMENTS 4,479,265 A * 10/1984 Muscatell .............. H04R 27/00
359/285
6,301,034 B1 * 10/2001 Speciale .............. H04R 23/008
398/133
(Continued)

OTHER PUBLICATIONS

Chennoukh, S., et al., "Speech Enhancement via Frequency Bandwidth Extension Using Line Spectral Frequencies," in Acoustics, Speech, and Signal Processing 2001, Proceeding (ICASSP'01), 2001 IEEE International Conference, vol. 1, IEEE, pp. 665-668, 2001.

(Continued)

*Primary Examiner* — Marcus T Riley
(74) *Attorney, Agent, or Firm* — Lowenstein Sandler LLP

(57) ABSTRACT

A device includes a coil and magnetic mass movable next to the coil in response to vibrations to generate a back electromotive force signal. An amplifier generates, from the back EMF signal, a vibration signal. A processing device converts the vibration signal to time-frequency domain signal as two-dimensional matrix of frequencies mapped against time slots. Pre-process voiced data of the time-frequency domain signal to generate a reduced-noise signal. Average signal values within a frequency window, and that exist at a first time slot, of the reduced-noise signal to generate a complex frequency coefficient. Shift the frequency window across the frequencies to generate multiple complex frequency coefficients that identify speech energy concentration. Replicate signal values at a fundamental frequency within the voiced data to multiple harmonic frequencies to generate an expanded voice source signal. Combine the speech energy concentration with the expanded voice source signal to recreate original speech.

26 Claims, 18 Drawing Sheets

(51) Int. Cl.
| | |
|---|---|
| *H02P 6/182* | (2016.01) |
| *H04R 9/08* | (2006.01) |
| *H02P 25/034* | (2016.01) |
| *H04R 29/00* | (2006.01) |
| *G10L 15/26* | (2006.01) |
| *G10L 21/00* | (2013.01) |

(52) U.S. Cl.
CPC .............. *H04R 1/2869* (2013.01); *H04R 9/08* (2013.01); *G10L 15/26* (2013.01); *G10L 21/00* (2013.01); *H04R 29/004* (2013.01)

(56) References Cited

U.S. PATENT DOCUMENTS

| | | | | |
|---|---|---|---|---|
| 7,334,735 | B1* | 2/2008 | Antebi | G01S 5/22 235/492 |
| 9,608,848 | B2* | 3/2017 | Roy | H04B 1/16 |
| 9,654,229 | B2* | 5/2017 | Kappus | H04B 11/00 |
| 10,123,753 | B2* | 11/2018 | Boyd | A61B 5/7455 |
| 2005/0220310 | A1* | 10/2005 | McGrath | H04R 23/00 381/56 |
| 2016/0233966 | A1* | 8/2016 | Kappus | H04B 11/00 |
| 2017/0179986 | A1* | 6/2017 | Roy | H04B 1/16 |
| 2018/0279968 | A1* | 10/2018 | Boyd | A61B 5/7455 |
| 2019/0223812 | A1* | 7/2019 | Boyd | A61B 5/6806 |

OTHER PUBLICATIONS

Farina, A., "Simultaneous Measurement of Impulse Response and Distortion with a Swept-Sine Techniquie," In Audio Engineering Society Convention 108 (2000), Audio Engineering Society, 25 pages, Feb. 19-22, 2000.
Feinberg, D.R., et al., "Manipulations of Fundamental and Formant Frequencies Influence the Attractiveness of Human Male Voices," Animal Behaviour 69, 3 (2005), published by Elsevier Ltd., pp. 561-568published online Dec. 7, 2004.
Gales, M.J.F. "Maximum Likelihood Linear Transformations for HNN-Based Speech Recognition," Computer Speech & Language 12, 2, Academic Press Limited, pp. 75-98, 1998.
Galili, I., et al, "Teaching Faraday's Law of Electromagnetic Induction in an Introductory Physics Course," American Journal of Physics 74 (4), pp. 337-343, Apr. 2006.
Gemmeke, J.F., et al., "Exemplar-Based Sparse Representation for Noise Robust Automatic Speech Recognition," IEEE Transactions on Audio, speech, and Language Processing, vol. 19, No. 7, pp. 2067-2080, Sep. 2011.
Hillenbrand, J., et al., "High-Sensitivity Piezoelectric Microphones Based on Stacked Cellular Polymer Films (L)," The Journal of the Acoustical Society of America 116, 6, (2004), pp. 3267-3270, Dec. 2004.
Hinton, G., et al., "Deep Neural Networks for Acoustic Modeling in Speech Recognition: The Shared Views of Four Research Groups," IEEE Signal Processing Magazine, pp. 82-97, Nov. 2012.
Huggins-Daines, D., et al., "Pocketsphinx: A Free, Real-Time Continous Speech Recognition System for Hand-Held Devices," In in Proceedings of ICASSP (2006), IEEE, pp. I-185-I188, 2006.
Jax, P., et al., "On Artificial Bandwidth Extension of Telephone Speech," Signal Processing 83 8 (2003), Elsevier Science B.V., pp. 1707-1719, 2003.
Keele JR, D., "Low-Frequency Loudspeaker Assessment by Nearfiled Sound-Pressure Measurement," Journal of the Audio Engineering Society, vol. 22, No. 3, pp. 154-162, Apr. 1974.
Kontio, J., et al., "Neural Network-Based Artificial Bandwidth Expansion of Speech," IEEE Transactions onAudio, Speech, and Language Processing, vol. 15, No. 3, pp. 873-881, Mar. 2007.
Laaksonen, L., et al, "Artificial Bandwidth Expansion Method to Improve Intelligibility and Quality of AMR-Coded Narrowband Speech," in ICASSP (1), pp. 809-812, Jan. 2005.
Lapteva, O., "Speaker Perception and Recognition: An Integrative Framework for Computational Speech Processing," Kassel University Press GmbH, Chapters 5-8, pp. 67-190, Jun. 29, 2011.
Michalevsky, Y., et al., "Gyrophone: Recognizing Speech from Gyroscope Signals," In Proceedings of the 23rd USENIX Seurity Symposium , USENIX Association, pp. 1053-1067, Aug. 20-22, 2014.
Moreno, P.J., et al., "Sources of Degradation of Speech Recognition in the Telephone Network," Proceedings of the IEEE International Conference on Acoustics, Speech, and Signal Processing, Adelaide, Australia, vol. I, pp. 109-112, Apr. 1994.
Nation, P., et al., "Vocabulary Size, Text Coverage and Word Lists," Vocabulary: Description, Acquisition and Pedagogy 14, pp. 6-19, 1997.
Qi, Y., et al., "Temporal and Spectral Estimations of Harmonics-to-Noise Ratio in Human Voice Signals," The Journal of the Acoustical Society of America 102, 1 (1997), pp. 537-543, Jul. 1997.
Smaragdis, P., et al., "Missing Data Imputation for Spectral Audio Signals," In Machine Learing for Signal Processing, 2009, MLSP 2009, IEEE International Workshop, IEEE, pp. 1-6, 2009.
Smeets, G., "Laser Interference Microphone for Ultasonics and Nonlinear Acoustics," The Journal of the Acooustical Society of America, vol. 61, No. 3, pp. 872-875, Mar. 1977.
Table Chart Sound Pressure Levels SPL Level Test Normal Voice Sound Levels Pressure Sound, "Table of Sound Levels (dB Scale) and the Corresponding Units of Sound Pressure and Sound Intensity (Examples) Decibel Level and Comparison of Common Sounds," http://www.sengpielaudio.com/TableOfSoundPressureLevels.htm, pp. 1-14, Retrieved May 24, 2018.
Tanner, P., et al., "A Pulsed Jumping Ring Apparatus for Demonstration of Lenz's Law," American Journal of Physics 69, 8, (2001), pp. 911-916, Aug. 2001.
Vanderheiden, G., "About Decibels (dB) Trace Research & Development Center," http://trace.umd.edu/docs/2004-About-dB, 8 pages, copyright 2016, retrieved on May 24, 2018.
"VibraPhone: Listening Through a Vibration Motor" University of Illinois at Urbana-Champaign, Department of Electrical and Compter Engineering, http://synrg.csl.illinois.edu/vibraphone/, 3 pages, retrieved on Jun. 1, 2018.
Waibel, A., et al., "Phoneme Recognition Using Time-Delay Neural Networks," IEEE Transactions on Acoustics, Speech, and Signal Processing, vol. 37, No. 3, pp. 328-339, Mar. 1989.
Wang, C.-C., et al., "High Sensitivity Pulsed Laser Vibormeter and its Application as a Laser Microphone," Applied Physics Letters, 94, 5, (2009), pp. 051112-1-05112-3, 2009.
Wei, T., et al., "Acoustic Eavesdropping Through Wireless Vibrometry," In Proceedings of the 21st Annual International Conference on Mobile Computing and Networking, ACM, pp. 130-141, 2015.
Zhang, L., et al., "Accelword: Energy Efficient Hotword Detection Through Accelerometer," In Proceedings o fthe 13th Annual International Conference on Mobile Systems, Applications, and Services, ACM, pp. 301-315, 2015.

* cited by examiner

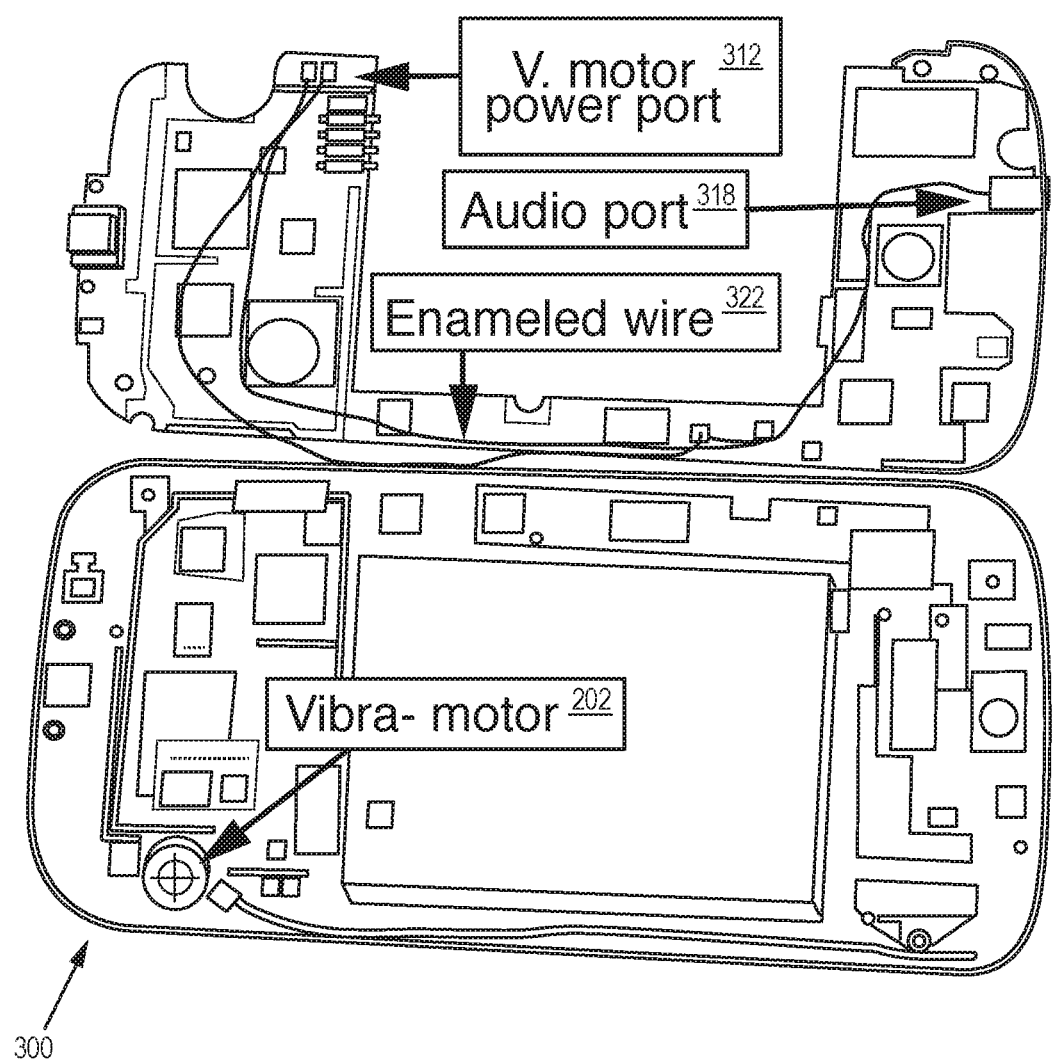
FIG. 3
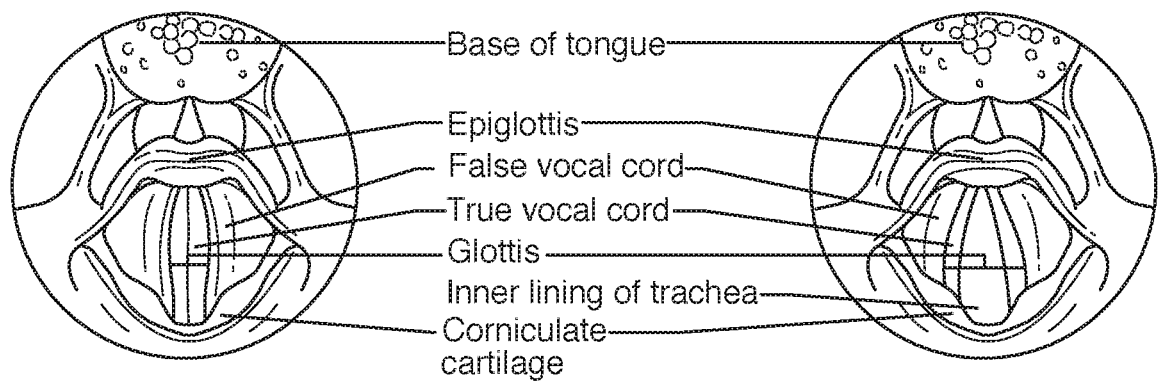
FIG. 4A
FIG. 4B

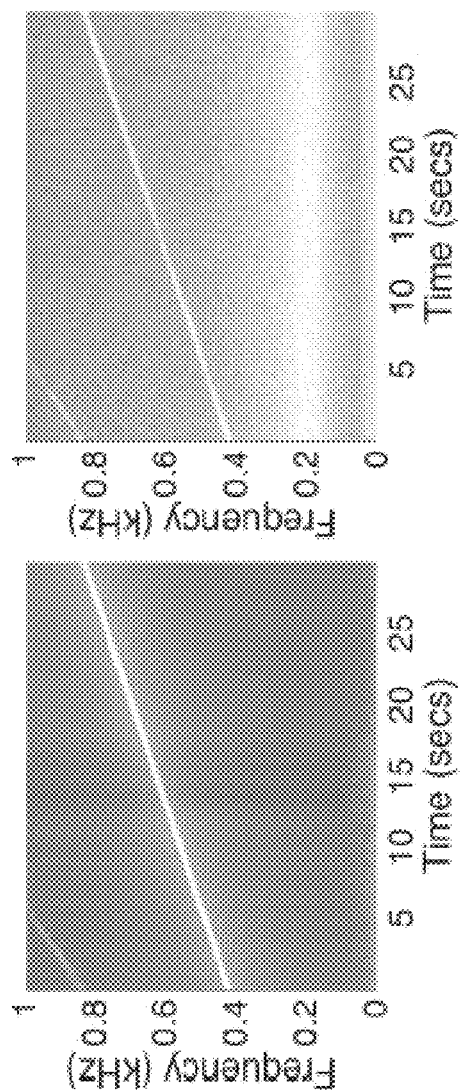
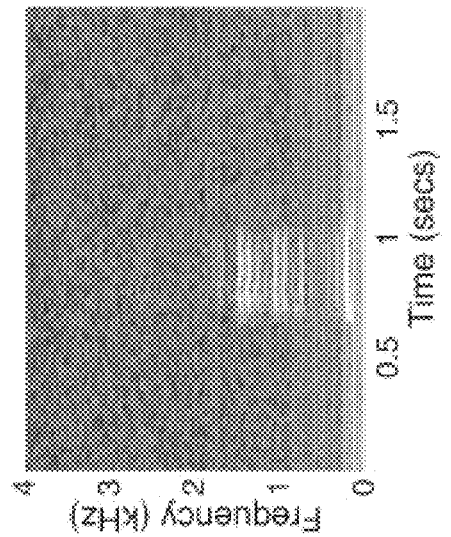
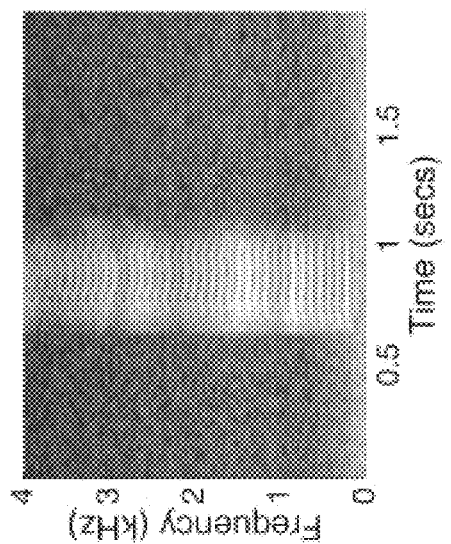
FIG. 8A  FIG. 8B  FIG. 9A  FIG. 9B

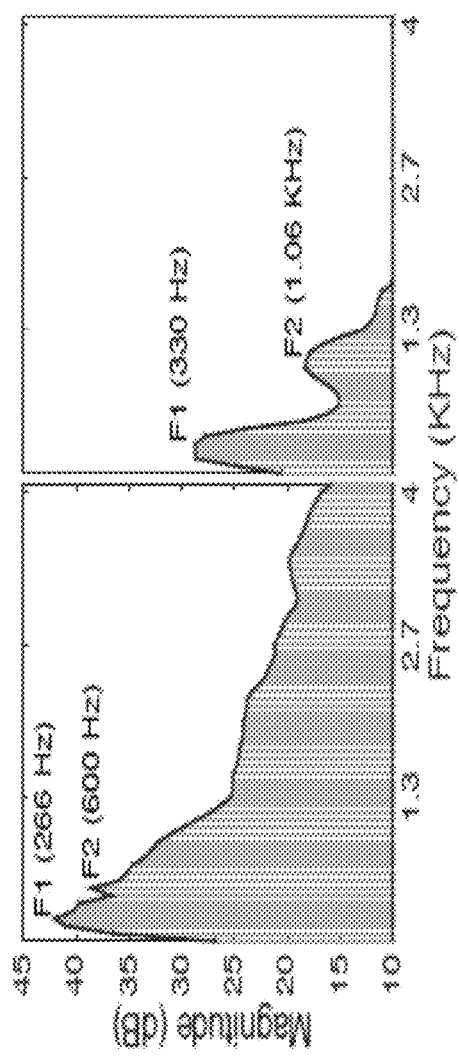
FIG. 13A
FIG. 13B
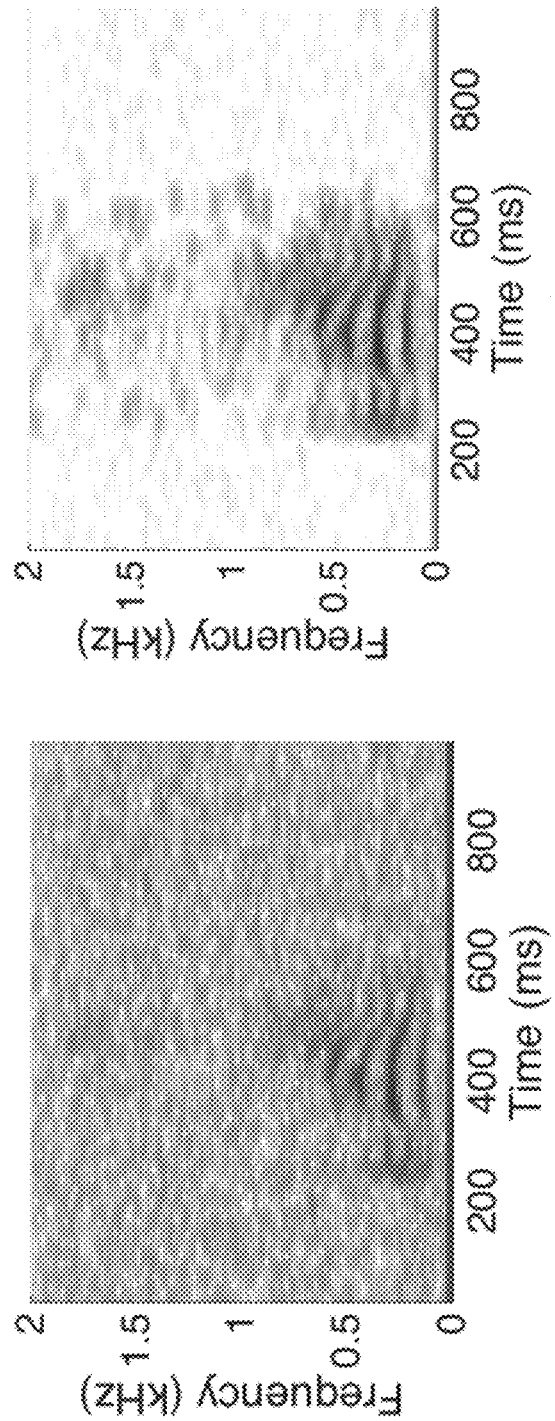
FIG. 14A
FIG. 14B

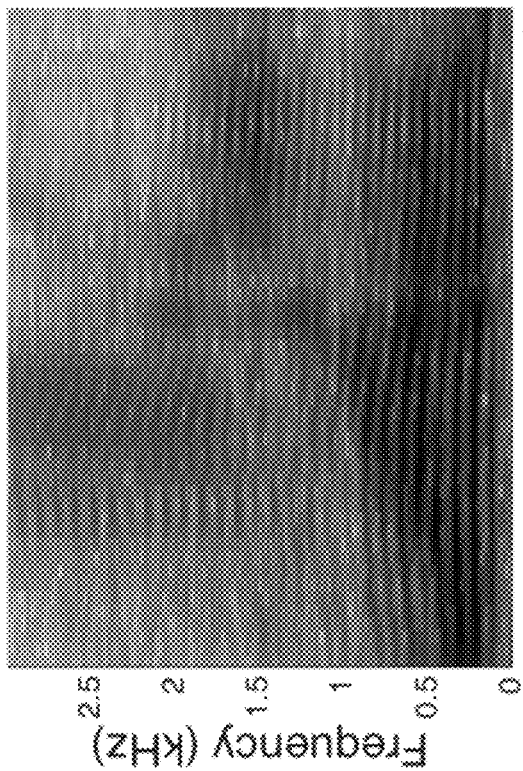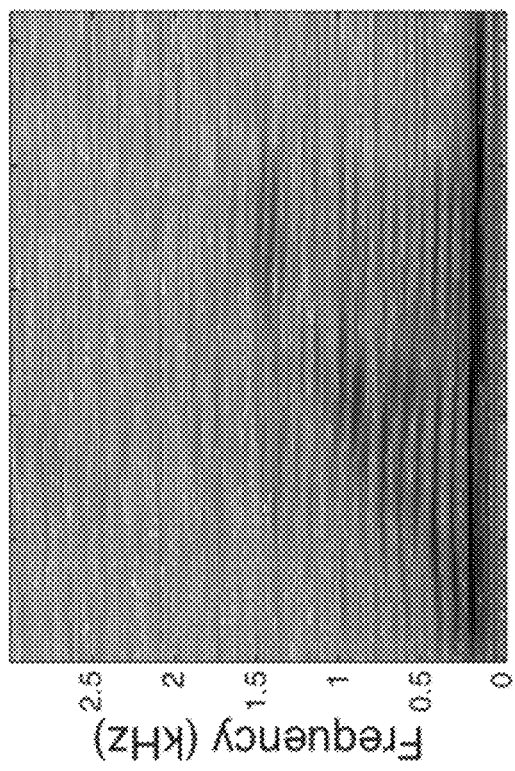
FIG. 15A
FIG. 15B
FIG. 15C

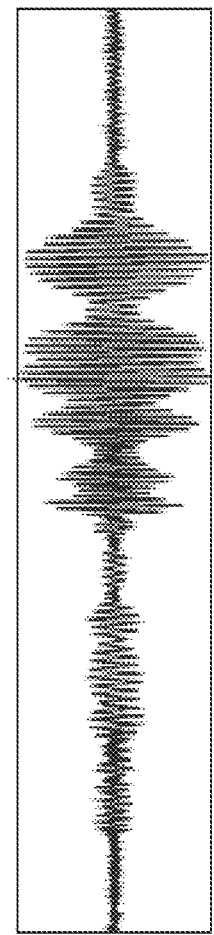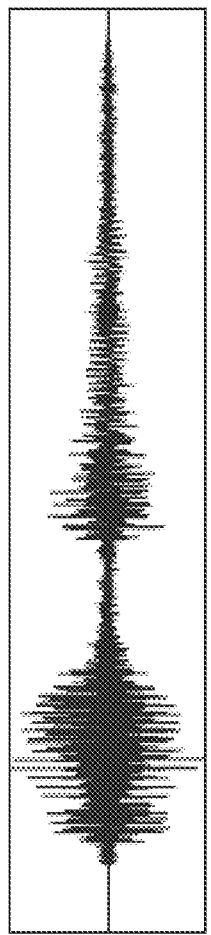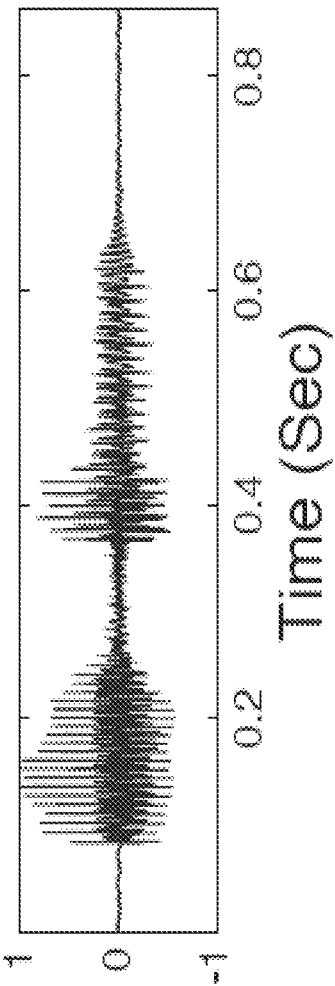
FIG. 17A
FIG. 17B
FIG. 17C

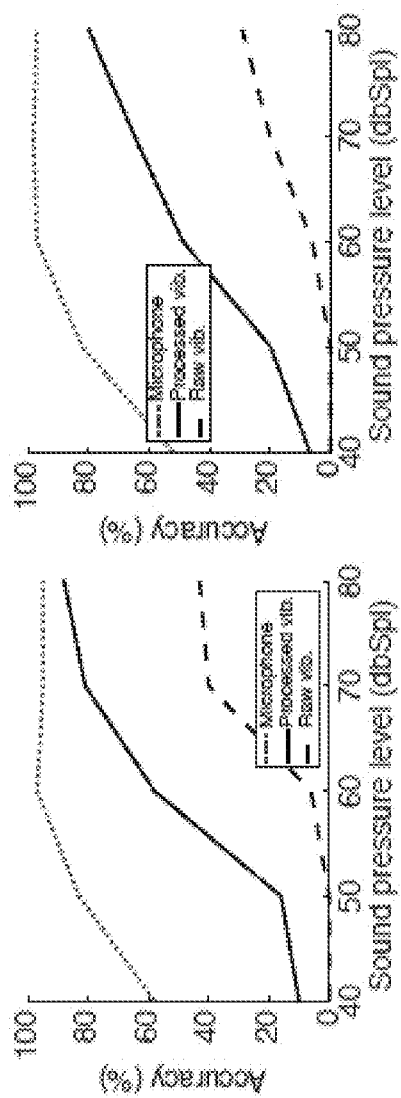
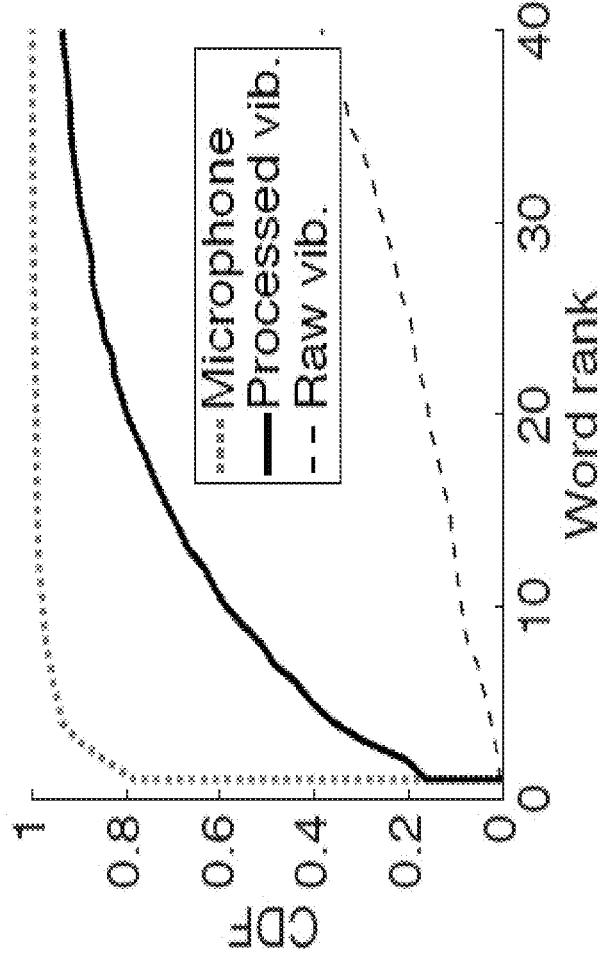
FIG. 18A
FIG. 18B
FIG. 19

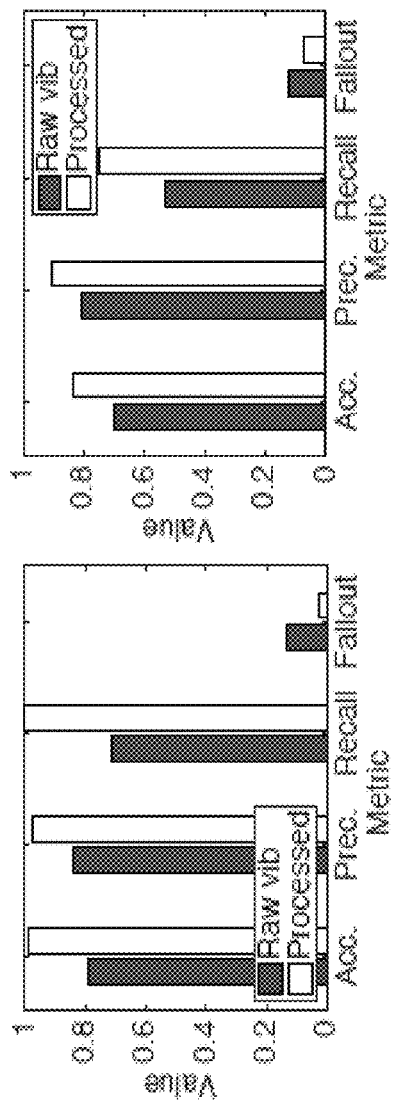
FIG. 22A
FIG. 22B
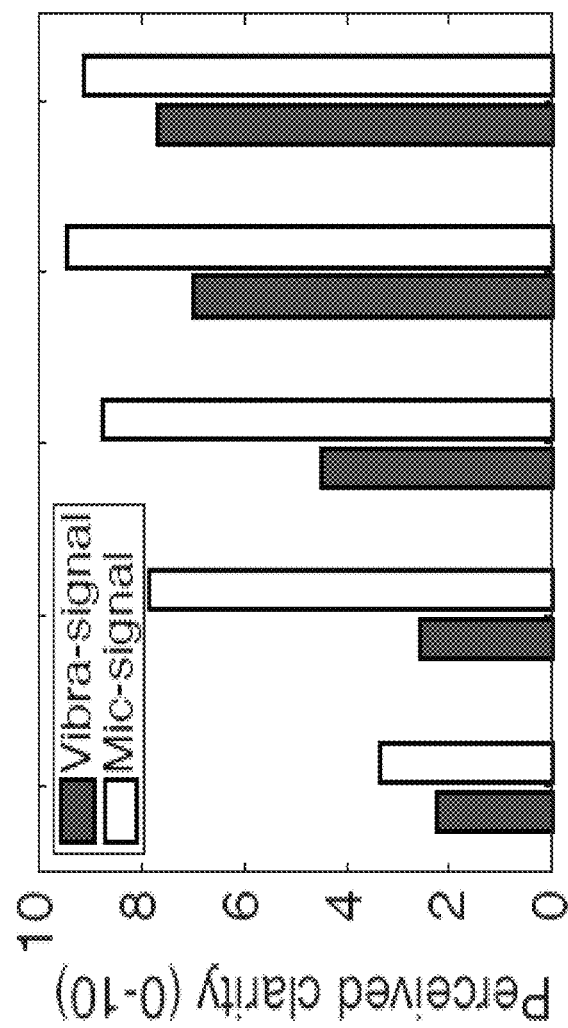
FIG. 23

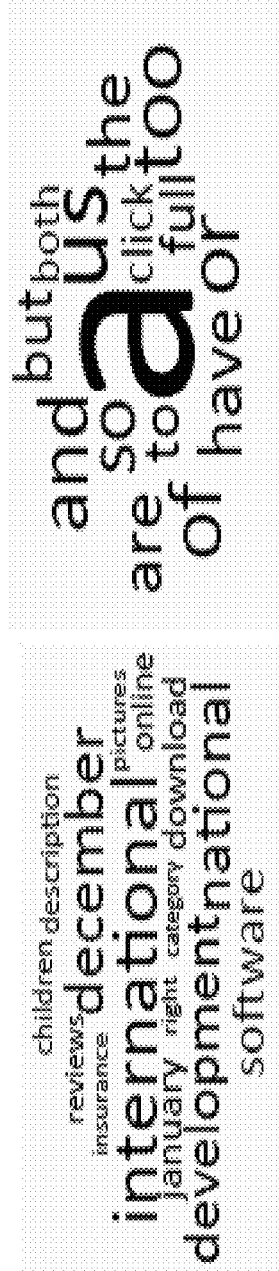
FIG. 24A
FIG. 24B
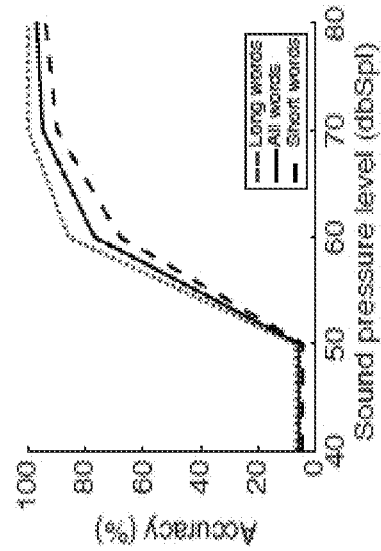
FIG. 25A
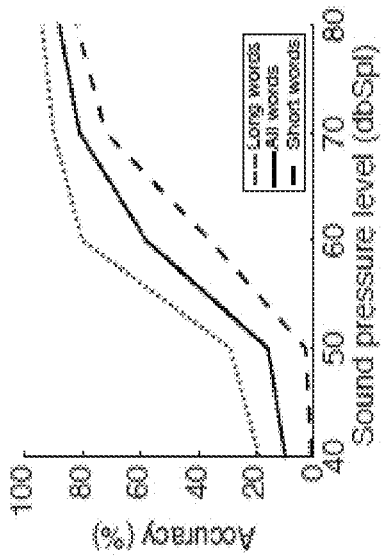
FIG. 25B

VIBRATIONAL DEVICES AS SOUND SENSORS

REFERENCE TO EARLIER FILED APPLICATION

This application claims the benefit under 35 U.S.C. § 119(e) of U.S. Provisional Patent Application No. 62/507,256, filed May 17, 2017, which is incorporated herein, in its entirety, by this reference.

FEDERALLY SPONSORED RESEARCH OR DEVELOPMENT

This invention was made with government support under CNS-1430033 and CNS-1423455 awarded by the National Science Foundation. The government has certain rights in the invention.

BACKGROUND

Motion sensors in smartphones have been shown to detect sound signal, for example from the rotational motions of smartphone gyroscopes or by the displacements of accelerometers. These sensors may enable continuous sound sensing, e.g., the energy-efficient accelerometer may always stay active, and turn on the energy-hungry microphone only upon detecting a keyword. While useful, these systems run pattern recognition algorithms on the features of the signals. The vocabulary is naturally limited to less than three keywords, as trained by a specific human speaker. Accordingly, while sound detection has been demonstrated, meaningful speech detection (e.g., that is meaningful to a human listener) has not been demonstrated.

Vibration motors, also called "vibra-motors," in the relevant art are small actuators embedded in many types of phones and wearables. These actuators have been classically used to provide tactile alerts to human users, and other types of electromechanical devices are envisioned that may be capable of generating vibration signals from human speech.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 3 is an image of a smartphone setup with a simple wire connected between an output of the vibra-motor to an audio line-in port of the smartphone according to an embodiment.

FIG. 4A is an image of constricted human vocal cords in which state voiced signals of speech are created.

FIG. 4B is an image of dilated human vocal cords in which state unvoiced signals of speech are created.

FIG. 8A is a graphed output illustrating the spectrogram of the microphone in response to a Sine Sweep signal (tones played at increasing narrow band frequencies) according to an embodiment.

FIG. 8B is a graphed output illustrating the spectrogram of the vibra-motor in response to a Sine Sweep signal according to an embodiment.

FIG. 9A is a graphed output illustrating the spectrogram of the spoken vowel "a" recorded with microphone according to an embodiment.

FIG. 9B is a graphed output illustrating the spectrogram of the spoken vowel "a" recorded with vibra-motor, which exhibits near-deafness for frequencies greater than two kilohertz (KHz) according to an embodiment.

FIG. 13A is a graph output illustrating formants of vowel "u" recorded through the microphone according to an embodiment.

FIG. 13B is a graph output illustrating formants of vowel "u" recorded through the vibra-motor according to an embodiment.

FIG. 14A is a graphed output of the spectrogram of the spoken word "yes" before spectral subtraction of noise according to an embodiment.

FIG. 14B is a graphed output of the spectrogram of the spoken word "yes" after spectral subtraction of noise according to an embodiment.

FIG. 15A is a graphed output of the raw audio signal from the vibra-motor according to an embodiment.

FIG. 15B is a graphed output the speech energy concentration, which makes the audio signal energy from the vibra-motor visible through a heat-map-like contour according to an embodiment.

FIG. 15C is a graphed output of the corresponding speech signal as detected by the microphone according to an embodiment.

FIG. 17A is a graphed output of the audio for the word "often" as manifested in the raw vibra-motor audio signal according to an embodiment.

FIG. 17B is a graphed output of the audio for the word "often" after the disclosed processing according to an embodiment.

FIG. 17C is a graphed output of the audio for the word "often" captured as a microphone signal according to an embodiment.

FIG. 18A is a graphed output illustrating automatic recognition accuracy as a function of loudness for the custom hardware setup of FIG. 2 according to an embodiment.

FIG. 18B is a graphed output illustrating automatic recognition accuracy as a function of loudness for the smartphone setup of FIG. 3 according to an embodiment.

FIG. 19 is a graphed output illustrating the cumulative distribution function (CDF) of word rank from prediction from automatic speech recognition (ASR) prediction at 50 dbSPL for the custom hardware setup of FIG. 2 according to an embodiment.

FIG. 22A is a bar graph illustrating the accuracy, precision, recall, and fall-out values for manual hot-phrase detection using the custom vibra-motor hardware setup of FIG. 2 according to an embodiment.

FIG. 22B is a bar graph illustrating the accuracy, precision, recall, and fall-out values for manual hot-phrase detection using the smartphone setup of FIG. 3 according to an embodiment.

FIG. 23 is a bar graph illustrating the perceived clarity of the correctly decoded speech recorded with microphone and vibration motor according to an embodiment.

FIG. 24A is a collage of the top 10 words that are correctly decoded by ASR according to an embodiment.

FIG. 24B is a collage of the top 10 words that are incorrectly decoded by ASR according to an embodiment.

FIG. 25A is a graph illustrating ASR accuracy for long (greater than six characters) and short (less than or equal to six characters) words as a function of loudness according to an embodiment.

FIG. 25B is a graph illustrating manual speech recognition (MSR) accuracy for long (greater than six characters) and short (less than or equal to six characters) words as a function of loudness according to an embodiment.

DETAILED DESCRIPTION

Figure 1:
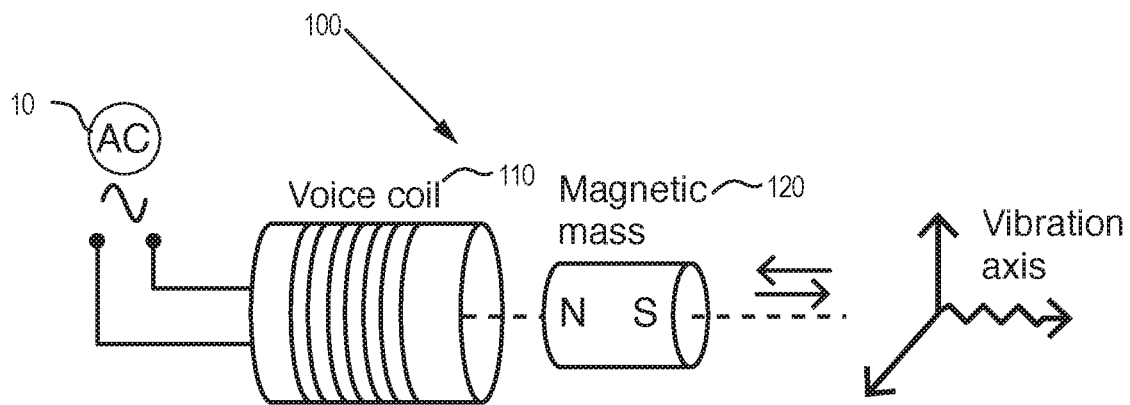
FIG. 1 is a diagram of an example linear resonant actuator (LRA) motor according to an embodiment.

The present disclosure provides for use of electromechanical devices, including vibra-motors and the like, as a sound or audio sensor based on the observation that the same movable mass that causes the pulsation in such a motor (or other electromechanical device) may also respond to changes in air pressure. Even though the vibra-motor is likely to be far less sensitive compared to the (much lighter) diaphragm of an actual microphone, speech from a vibra-motor may still be captured at a sufficient level of fidelity to be reproduced. Unlike prior work, instead of learning a motion signature, the disclosed system and methods attempt to reconstruct the inherent speech content from the low bandwidth, highly distorted output of the vibra-motor, which is the device used for purposes of experimentation, although other similar electromechanical devices are envisioned. Hence, there are no vocabulary restrictions, and the output of the vibra-motor may be decodable by speech-to-text software or simply output through a speaker.

Even modest reproduction of sound could prompt new applications and threats. On one hand, wearable devices like Fitbits™ (or other fitness monitors) that do not have a microphone may now respond to voice commands. Further, in devices that already have microphones, perhaps better signal-to-noise ratio (SNR) could be achieved by combining the uncorrelated (noise) properties of the vibra-motor with microphone detection, facilitating stronger eavesdropping capability. Furthermore, leaking sound through vibra-motors opens new side channels so that malware code that has default access to a smartphone's vibra-motor may now be able to eavesdrop into phone conversations. Toys that have vibra-motors embedded could potentially listen to the ambience of regular family conversations. As will be discussed, a vibra-motor may be sufficiency efficient as a sound sensor, with the correct processing, to turn vibration signals into human speech signals capable of output through a speaker to as text.

The present disclosure demonstrates that the vibration motor, present in most mobile devices today, can be used as a listening sensor, similar to a microphone. While this is not fundamentally surprising (since vibrating objects should respond to ambient air vibrations), the ease and extent to which the actuator of the vibration motor may detect sounds has been unexpected. For example, the decoded sounds are not merely vibration patterns that correlate to some spoken words; rather, the decoded sounds may actually contain the phonemes and structure of human voice, thereby requiring no machine learning or pattern recognition to extract them. With various signal processing techniques, combined with the structure of human speech, the output of the vibra-motor may be quite intelligible to most human listeners. Even automatic speech recognizers (ASRs) were able to decode the majority of the detected words and phrases, especially at higher loudness. The application space of such systems remains open, and could range from malware eavesdropping into human phone conversation, to voice controlled wearables, to better microphones that use the vibra-motor as a second multiple-in, multiple-out (MIMO) antenna.

As a first step towards converting a vibra-motor into a sound sensor, the disclosed system and methods exploit the notion of reverse electromotive force (e.g., back EMF) in electronic circuits. Briefly, the alternating current (A/C) in the vibra-motor creates a changing magnetic field around a coil, which in turn causes the vibra-motor mass to vibrate. However, when an external force impinges on the same mass, say due to the pressure of ambient sound, it causes additional motion, translating into a current in the opposite direction. This current, the back EMF, may generate a reverse electromotive force signal (or back EMF signal) that may be detected through an analog-to-digital converter (ADC) after sufficient amplification. The ADC may be located within an amplification circuit that also amplifies the vibration signal received from the vibra-motor. In embodiments, the signal extracted from the back-EMF is noisy and at a lower bandwidth than human speech. However, given that human speech obeys an "acoustic grammar," an opportunity exists to recover the spoken words even from the back-EMF's signal traces. The disclosed system focuses on this problem, and develops a sequence of techniques, including spectral subtraction, energy localization, formant extrapolation, and harmonic reconstruction, to ultimately distill out legible speech. A formant is a concentration of sound energy associated with a vowel or consonant of speech.

Our experimentation platform includes both a Samsung® smartphone and a custom circuit that uses vibra-motor chips purchased online (these chips are the same chips used in today's smartphones and wearables). We characterize the extent of signal reconstruction as a function of the loudness of the sound source. Performance metrics are defined by the accuracy with which the reconstructed signals are intelligible to humans and to (open-source) automatic speech recognition software. We use the smartphone microphone as an upper bound, and for fairness, record the speech at the same sound pressure level (SPL) across the devices on which we experiment. We also experiment across a range of scenarios within our university building, and observe that results are robust/useful when the speaker is less than two meters from the vibra-motor. Finally, we emphasize that smartphone vibra-motors cannot be used as microphones today, primarily because the actuator is simply not connected to an ADC. To this end, launching side-channel attacks is not immediate. However, as discussed later, we find that enabling the listening capability calls for almost trivial rewiring (just soldering at four clearly visible junctions). This disclosure sidesteps these immediacy questions and concentrates on the core nature of the information leakage. At the least, we hope this work will draw attention to the permission policies on vibra-motors, which today are generally open to applications of smartphones by default.

FIG. 1 is a diagram of an example linear resonant actuator (LRA) motor 100 according to an embodiment. A vibra-motor is an electromechanical device that moves a magnetic mass 120 rhythmically around a neutral position to generate vibrations. While there are various kinds of vibra-motors, a popular one is the LRA motor 100 illustrated in FIG. 1. With LRA, vibration is generated by the linear movement of the magnetic mass 120 suspended near a metal coil 110, which may be termed the voice coil for purposes of the application of the LRA motor 100 as an audio sensor. Upon applying AC current to the LRA motor, the metal coil may also behave like a magnet (due to the generated electromagnetic field) and causes the mass to be attracted or repelled, depending on the direction of the current. This generates vibration at the same frequency as the input AC signal, while the amplitude of vibration is dictated by the signal's peak-to-peak voltage. Thus LRAs offer control on both the magnitude and frequency of vibration. Most smartphones today use LRA-based vibra-motors.

Back-EMF is an electromagnetic effect observed in magnet-based motors when relative motion occurs between the current carrying armature/coil and the field of the magnetic mass 120. According to Faraday's law of electromagnetic induction, this changing magnetic flux induces an electromotive force in the coil. Lenz's law says this electromotive force acts in the reverse direction of the driving voltage, which called counter-electromotive force (CEMF) or back EMF of the motor. As the rate of change of the magnetic flux is proportional to the speed of the magnetic mass, the back EMF serves as an indicator of the extraneous vibration experienced by the mass.

Because sound is a source of external vibration, the magnetic mass 120 in the vibra-motor is expected to exhibit a (subtle) response to the external vibration. Our experiments show that, when the vibra-motor is connected to an ADC, the back EMF generated by the ambient sound may be recorded. This is possible even when the vibra-motor is passive, e.g., not pulsating to produce tactile alerts. We call this ADC output the vibration signal to distinguish it from the microphone signal to which we will later use as a baseline for comparison.

Figure 2:
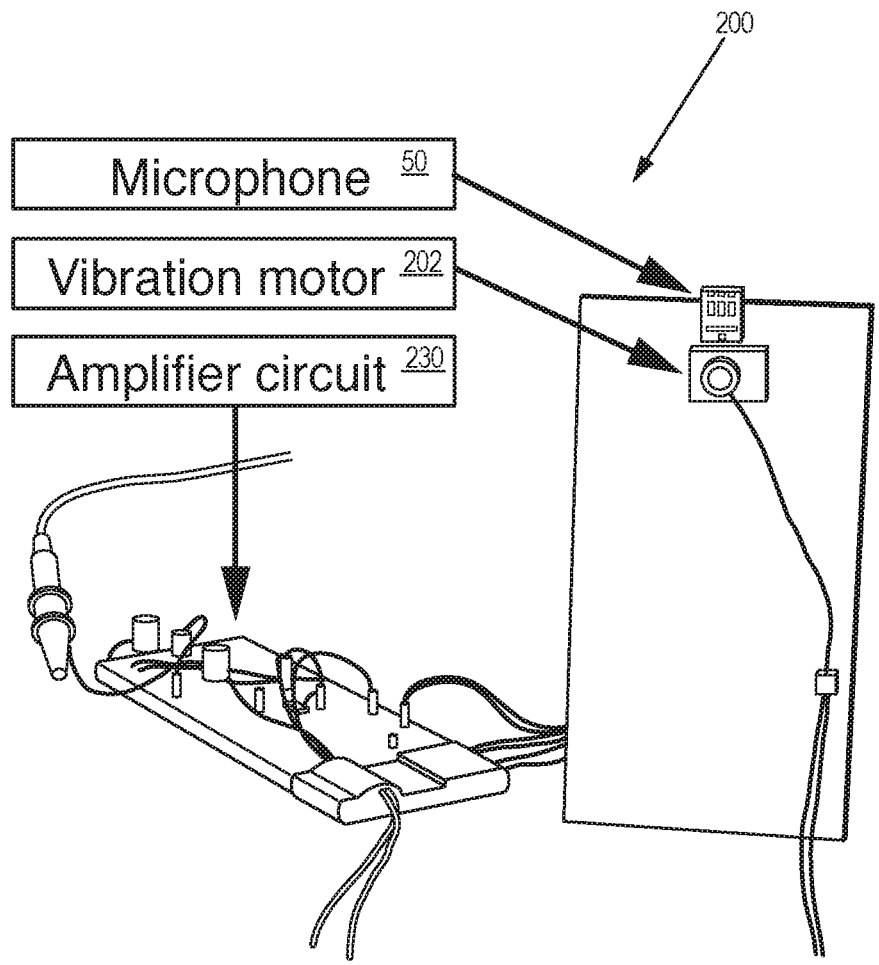
FIG. 2 is an image of a custom hardware setup with collocated vibration motor ("vibra-motor") and microphone for testing purposes according to an embodiment.

FIG. 2 is an image of a custom hardware setup 200 with collocated vibration motor ("vibra-motor") 202 and microphone 50 for testing purposes according to an embodiment. Today's smartphones offer limited exposure, e.g., through application programming interfaces, to vibra-motor capabilities and other hardware components (e.g., amplifiers). To bypass these restrictions, we have designed the custom hardware setup 200 using off-the-shelf LRA vibra-motor chips connected to proprietary ADC and amplifier, together embodied within the amplifier circuit 230, to generate an amplified vibration signal. Note the vibration motor 202 may be mounted adjacent to the microphone 50, which may be a standard microphone that serves as a comparative baseline. The vibration signal is amplified and sampled at 16 kilohertz (KHz) in this particular experiment. Test sounds included live speech from humans at varying distances, as well as sound playbacks through speakers at varying loudness levels.

FIG. 3 is an image of a smartphone setup 300 with a simple wire 322 connected between an output of the vibra-motor (e.g., a power port 312) to an audio line-in port 318 of the smartphone according to an embodiment. While the custom hardware 200 offers better programmability, we also use the smartphone setup 300 to understand the possibilities with today's systems. FIG. 3 shows a prototype, which includes terminals of the built-in vibra-motor of a Samsung® Galaxy S-III smartphone connected to the audio line-in port 318 with a simple wire. The rewiring is trivial, for someone familiar with the process, it can be completed in less than 10 minutes. Once rewired, we collect the samples of the vibra-signal from the output channels of the earphone jack, using a custom Android® application.

We conducted a micro-benchmark test to verify that the vibration motor signal is not influenced by the electromagnetic coupling from the nearby microphone or speakers in our test setup. We removed the speakers and microphones from the test environment and directly record human speech with the vibration motor. Later, we compare the vibration motor signal with the recordings of the custom test setup 200 to find no noticeable difference in signal quality.

FIG. 4A is an image of constricted human vocal cords in which state voiced signals of speech are created. FIG. 4B is an image of dilated human vocal cords in which state unvoiced signals of speech are created. Human speech can be viewed as periodic air waves produced by the lungs, modulated through a sequence of steps in the throat, nose, and mouth. More specifically, the air from the lungs first passes through the vocal cords, a pair of membranous tissue, which constricts or dilates to block or allow the air flow.

When the vocal cords are constricted (FIG. 4A), the vibrations induced in the air-flow are called voiced signals. The voiced signals generate high energy pulses in the frequency domain and contain a fundamental frequency and its harmonics, e.g., on or more harmonic frequency of the fundamental frequency. All vowels and some consonants, such as "b" and "g," are sourced in voiced signals.

On the other hand, when the vocal cords dilate (FIG. 4B) and allow the air to flow through without heavy vibrations, the vocal cords generate what are called unvoiced signals. Unvoiced signals sound similar to noise, and is the origin of certain consonants, such as "s," "f," "p," "k," and "t." Both voiced and unvoiced signals then pass through a flap of tissue, called the glottis, which further pulsates to add power to the signal as well as distinctiveness to an individual's voice. These glottal pulses travel further and are finally modulated by the oral/nasal cavities to produce fine-tuned speech. The modulation of speech by the oral cavity includes the inside of the check, the tongue, and the lips, for example. The speech production process is often modeled as a "source-filter" in literature, essentially implying that the human trachea and mouth applies a series of filters to the source sound signal. This source-filter model will later prove useful in reconstructing the original speech signal.

Figure 5:
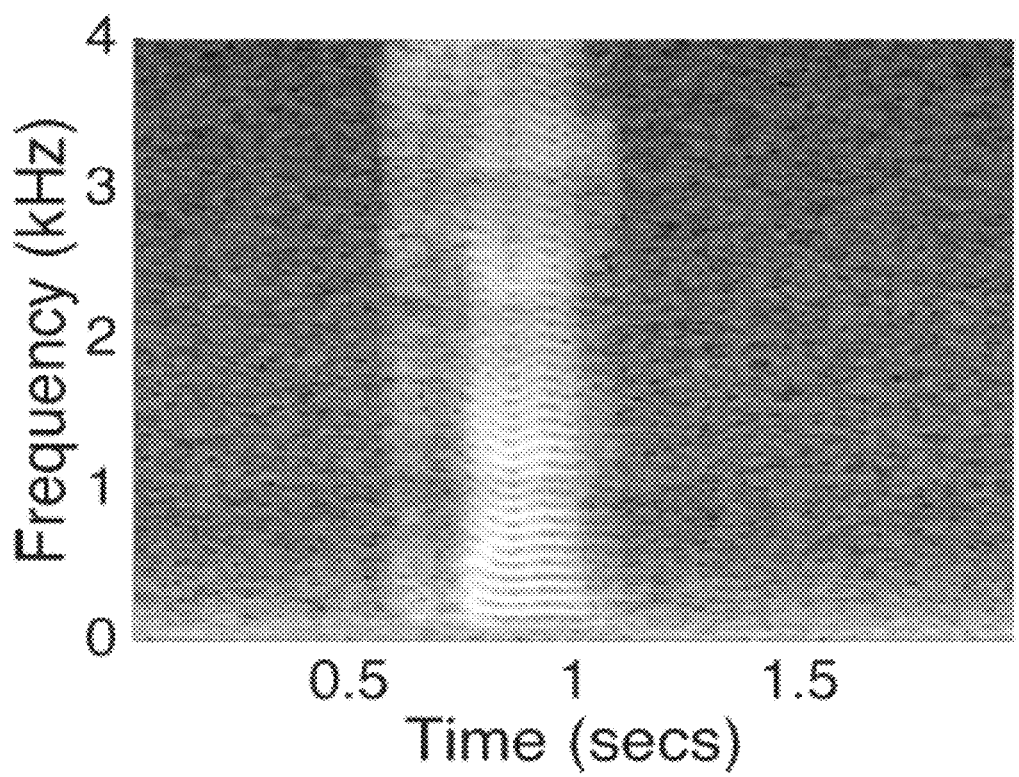
FIG. 5 is a graphed output illustrating the spectrogram of the spoken consonant "s" followed by the spoken vowel "a" recorded with a microphone according to an embodiment.

While the above discussions present a biological/linguistics point of view, we now discuss how they relate to the recorded speech signals and their structures. FIG. 5 is a graphed output illustrating the spectrogram of the spoken consonant "s" followed by the spoken vowel "a" recorded with a microphone according to an embodiment. Accordingly, the spectrogram of FIG. 5 illustrates when a human user pronounces the letters "sa," where the signal was recorded through a smartphone microphone (not a vibra-motor). The spectrogram captures the key building blocks of speech structure.

With continued reference to FIG. 5, note that the first visible signal (between 0.6 and 0.75 seconds) corresponds to the unvoiced component, the consonant "s." This signal is similar to noise with energy spread out rather uniformly across the frequency band. The energy content in this signal is low to moderate. The second visible signal corresponds to the vowel "a" and is an example of the voiced component. The signal shows a low fundamental frequency and many harmonics up to 4 KHz. Fundamental frequencies are around 85-180 Hz for males and 165-255 Hz for females. The energy content of this signal is far stronger than the unvoiced counterpart.

Within the voiced signal, the energy content is higher in the lower frequencies. These strong low frequency components determine the intelligibility of the spoken phonemes, e.g., the perceptually distinct units of sound, and are referred to as formants. The first two formants (say, F1, F2) remain between 300-2500 Hz and may form the sound of the vowels, while some consonants have another significant formant, F3, at a higher frequency.

Figures 6A, 6B:
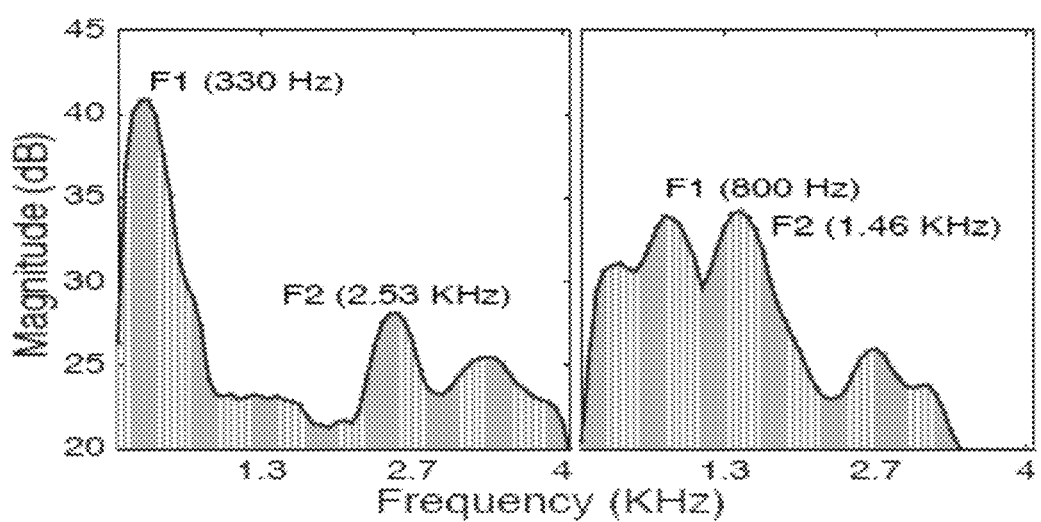
FIG. 6A is a graph illustrating the locations of the first two formants (F1 and F2) for the vowel sound "i," as recorded with a microphone according to an embodiment.
FIG. 6B is a graph illustrating the locations of the first two formants (F1 and F2) for the vowel sound "a," as recorded with microphone according to an embodiment.

FIG. 6A is a graph illustrating the locations of the first two formants (F1 and F2) for the vowel sound "i," as recorded with a microphone according to an embodiment. FIG. 6B is a graph illustrating the locations of the first two formants (F1 and F2) for the vowel sound "a," as recorded with microphone according to an embodiment. In extracting human speech from the vibra-motor's back-EMF signal, the disclosed system and methods will need to identify, construct, and bolster these formants through signal processing.

Figure 7B:
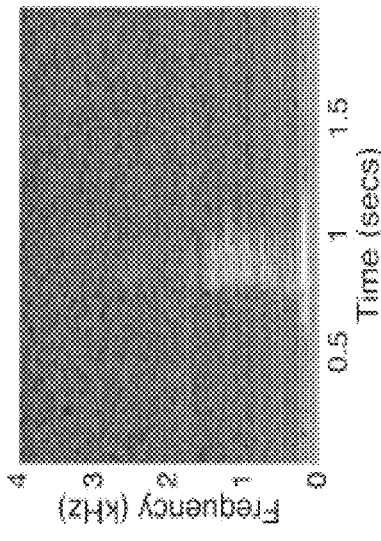
FIG. 7B is a graphed output illustrating the spectrogram for "sa" as recorded by the vibra-motor according to an embodiment.
Figure 7D:
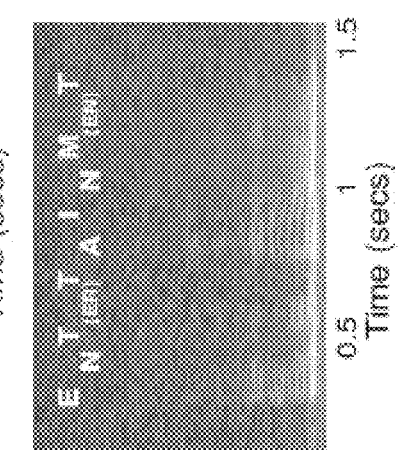
FIG. 7D is a graphed output illustrating the spectrogram for the full word "entertainment" as recorded by the vibra-motor according to an embodiment.
Figure 7A:
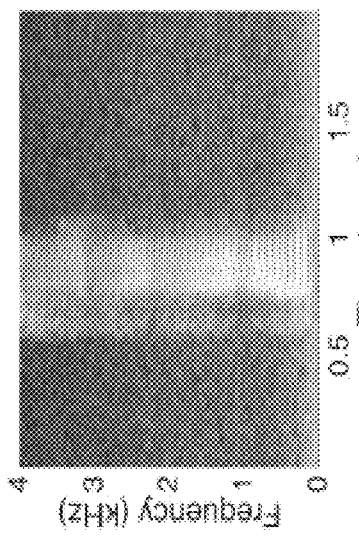
FIG. 7A is a graphed output illustrating the spectrogram for "sa" as recorded by the microphone according to an embodiment.
Figure 7C:
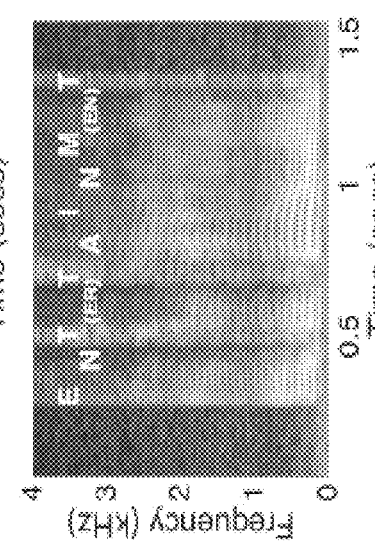
FIG. 7C is a graphed output illustrating the spectrogram for the full word "entertainment" as recorded by the microphone according to an embodiment.

FIG. 7A is a graphed output illustrating the spectrogram for "sa" as recorded by the microphone according to an embodiment. FIG. 7B is a graphed output illustrating the spectrogram for "sa" as recorded by the vibra-motor according to an embodiment. FIG. 7C is a graphed output illustrating the spectrogram for the full word "entertainment" as recorded by the microphone according to an embodiment. FIG. 7D is a graphed output illustrating the spectrogram for the full word "entertainment" as recorded by the vibra-motor according to an embodiment. Note the difference in these spectrograms between the output of the microphone and that of the vibra-motor. The vibra-motor's response is weak and incomplete, and on careful analysis, exhibits various kinds of distortions, even where the signal is apparently strong. The goal of the present disclosure is to reconstruct, to the extent possible, the output of the microphone from the output of the vibra-motor.

Rigid objects tend to oscillate at a fixed natural frequency when struck by an external force. When the force is periodically repeated at a frequency close to the object's natural frequency, the object shows exaggerated amplitude of oscillation, called resonance. Resonance is often an undesirable phenomenon, destabilizing the operation of an electromechanical device. Microphones, for example, carefully avoid resonance by designing its diaphragm at a specific material, tension, and stiffness so that the resonance frequencies lie outside the operating region. In some cases, additional hardware is embedded to dampen the vibration at the resonant frequencies.

Unfortunately, vibra-motors used in today's smartphones exhibit sharp resonance between 216 to 232 Hz, depending on the mounting structure. Some weak components of speech formants are often present in these bands. These weak components get amplified and appear as a pseudo-formant, e.g., unexpected sounds manifested within uttered words, which affect intelligibility of the words. The impact is exacerbated when the fundamental frequency of the voiced signal is itself close to the resonant band. In such cases, the sound itself gets garbled.

FIG. 8A is a graphed output illustrating the spectrogram of the microphone in response to a Sine Sweep signal (tones played at increasing narrow band frequencies) according to an embodiment. FIG. 8B is a graphed output illustrating the spectrogram of the vibra-motor in response to a Sine Sweep signal according to an embodiment. These graphs illustrate the effect of resonance when the vibration motor is sounded with different frequency tones in succession, e.g., a Sine Sweep signal. Observe that for tones in the Sine Sweep, the vibra-motor exhibited appreciable response in the resonance band, e.g., an over-sensitive resonance frequency band near 220 Hz. This is because the tones have some frequency tail around the 225 Hz, which tones get magnified, as illustrated in FIG. 8B. The microphone (FIG. 8A) exhibits no such phenomenon. The disclosed system and methods will effectively cope with resonance.

The vibra-motor's effective diaphragm, the area amenable to the impinging sound, is around 10 mm, almost 20 times larger than that of a typical MEMS microphone (e.g., 0.5 mm). This makes the vibration motor directional for the high frequency sounds, e.g., the high frequencies arriving from other directions are suppressed, somewhat like a directional antenna. Unfortunately, human voices contain lesser energy at frequencies higher than 2 KHz, thereby making the vibra-motor even less effective in detecting these sounds. Some consonants and some vowels, such as "i" and "e" have formants close to or higher than 2 KHz and are thus severely affected.

FIG. 9A is a graphed output illustrating the spectrogram of the spoken vowel "a" recorded with microphone according to an embodiment. FIG. 9B is a graphed output illustrating the spectrogram of the spoken vowel "a" recorded with vibra-motor, which exhibits near-deafness for frequencies greater than two KHz according to an embodiment. As noted in FIG. 9B, the vibra-motor is almost deaf to higher frequencies (greater than 2 KHz) in the sense that the vibra-motor seems unable to detect these higher frequencies.

A microphone's sensitivity, e.g., the voltage produced for a given sound pressure level, heavily depends on the weight and stiffness of its diaphragm. The spring-mass arrangement of the vibra-motor is considerably stiffer, mainly due to the heavier mass and high spring constant. While this is desirable for a vibration actuator, it is unfavorable to sound sensing. Thus, using the actuator as a sensor yields low sensitivity in general, and particularly to certain kinds of low-energy consonants (like f, s, v, z), called fricatives. A fricative denotes a type of consonant made by the friction of breath in a narrow opening, producing a turbulent air flow. The effect is visible in FIG. 7B where the fricative consonant "s" goes almost undetected with vibra-motors.

In any electrical circuit, thermal noise is an unavoidable phenomena arising from the Brownian motion of electrons in resistive components. Fortunately, the low 26 Ohm terminal resistance in vibra-motors leads to 10 dB lower thermal noise than the reference MEMS microphone. However, due to low sensitivity, the strength of the vibra-signal is significantly lower, resulting in poor SNR across most of the spectrum.

Figure 10A:
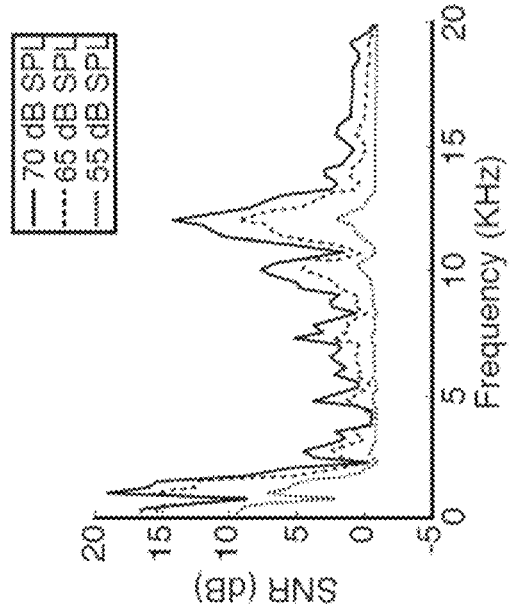
FIG. 10A is a graphed output of the signal-to-noise ratio (SNR) of the microphone at various frequencies for varying sound pressure levels (dbSPL) according to an embodiment.
Figure 10B:
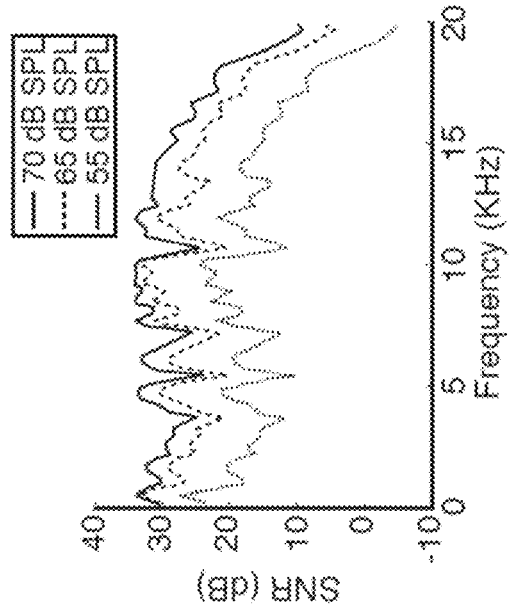
FIG. 10B is a graphed output of the SNR of the vibra-motor at various frequencies for varying sound pressure levels according to an embodiment.

FIG. 10A is a graphed output of the signal-to-noise ratio (SNR) of the microphone at various frequencies for varying sound pressure levels (dbSPL) according to an embodiment. FIG. 10B is a graphed output of the SNR of the vibra-motor at various frequencies for varying sound pressure levels according to an embodiment. FIGS. 10A and 10B compare the SNR at different sound pressure levels; except around the resonance frequencies, the SNR of the vibra-signal is significantly less compared to the microphone. Sound Pressure Level (SPL) is a metric to measure the effective pressure caused by sound waves with respect to a reference value, and is typically expressed in dbSPL. This gives a standard estimate of the sound field at the receiver, irrespective of the location of the sound source.

Figure 11:
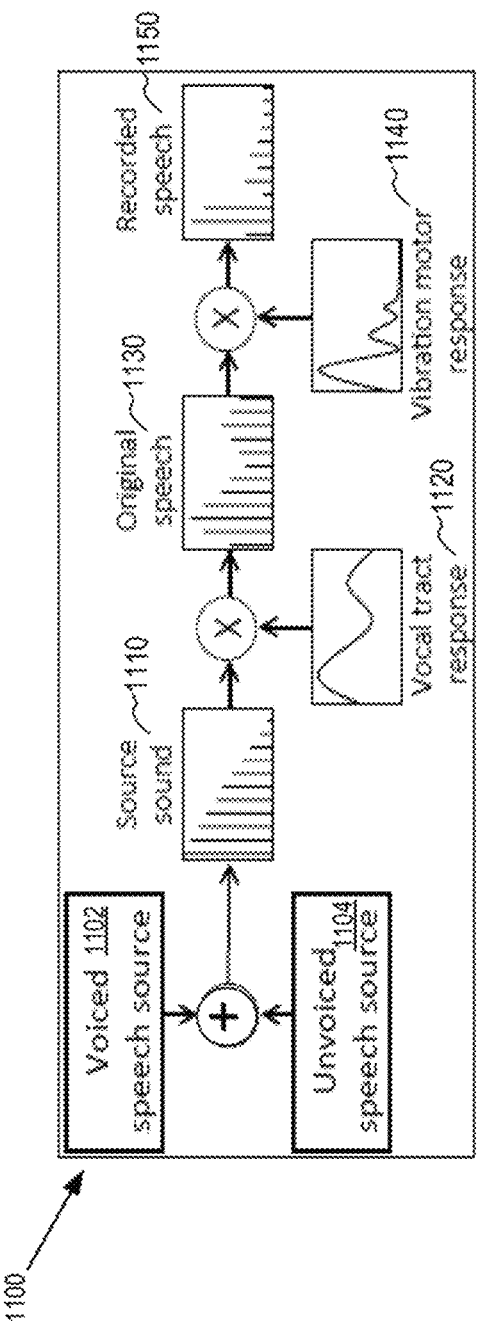
FIG. 11 is a flow diagram illustrating the source-filter model of the speech generation and recording of speech captured by a vibra-motor according to an embodiment.

The disclosed system design may be modeled as a source-filter, e.g., we treat the final output of the vibra-motor as a result of many filters applied serially to the original air-flow from the lungs. FIG. 11 is a flow diagram 1100 illustrating the source-filter model of the speech generation and recording of speech captured by a vibra-motor according to an embodiment. Accordingly, the disclosed system may perform at least two broad tasks: (1) "undo" the vibra-motor's distortions for signal components that have been detected, and (2) reconstruct the undetected signals by leveraging the predictable speech structure in conjunction with the slight "signal hints" picked up by the vibra-motor. The system realizes these tasks through at least two corresponding modules, namely, signal pre-processing and partial speech synthesis.

The flow diagram 1100 illustrates voiced speech source 1102 being combined with unvoiced speech source 1104, to generate a source sound signal 1110, which is made up of both voiced and unvoiced speech components. A vocal tract response 1120 may then be multiplied by the source sound signal 1110 to generate an original speech signal 1130. The vocal tract response 1120 may be like an energy filter or energy mask applied to the source sound signal 1110. The original speech signal 1130 may then be multiplied by a vibration motor response 1140 (which is device specific) to generate a recorded speech signal 1150 for the particular vibra-motor. Understanding this flow, the disclosed system and methods are work backwards from the recorded speech signal 1150 through reduction of noise from the vibration motor response, and regenerate the source sound signal 1110 and the vocal tract response 1120, because the combination of these two signals results in the original speech signal 1130 that we want.

Signal Pre-Processing

Figure 12:
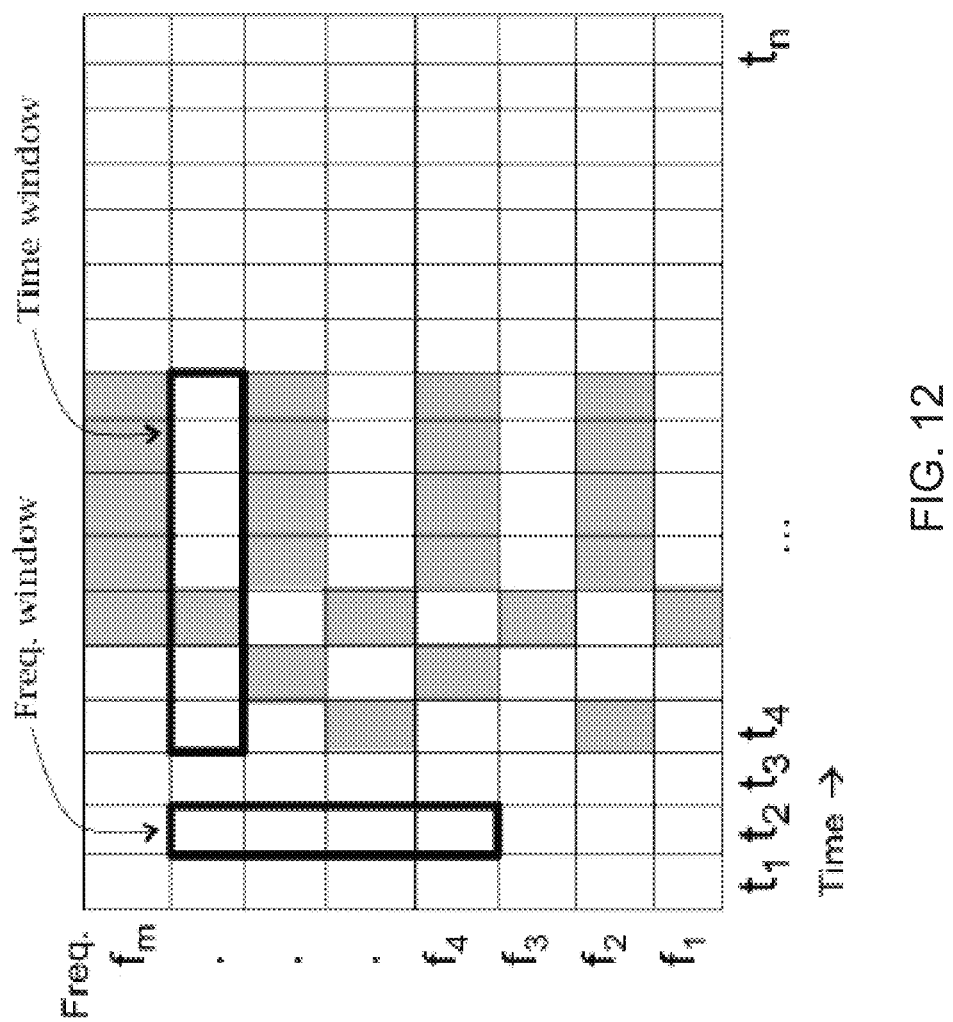
FIG. 12 is an image illustrating a two-dimensional, time-frequency matrix according to an embodiment.

The disclosed algorithms may operate on the frequency domain representation of the signal. Therefore, the system first converts the amplified signal to the time-frequency domain, e.g., using the Short Time Fourier Transform (STFT), which may compute the complex Fast Fourier Transform (FFT) coefficients from 100 ms segments (80% overlapped, Hanning windowed) of the input time signal. The result is a two-dimensional (2D) time-frequency matrix that may be referred to as a time-frequency signal. As illustrated in FIG. 12, each column of the time-frequency matrix is a time slot (e.g., a slice of time) and each row is a positive frequency bin, which may be a discrete frequency or a short span of frequencies.

Frequency Domain Equalization

When a microphone is subject to a Sine Sweep test, the frequency response is typically flat, meaning that the microphone responds almost uniformly to each frequency component. The vibra-motor's response, on the other hand, is considerably jagged, and thereby induces distortions into the arriving signal. FIG. 13A is a graph output illustrating formants of vowel "u" recorded through the microphone according to an embodiment. FIG. 13B is a graph output illustrating formants of vowel "u" recorded through the vibra-motor according to an embodiment. The vibra-motor distortions on "u" are quite dramatic, altering the original formants at 266 and 600 Hz to new formants at 300 Hz and 1.06 KHz, respectively. In fact, the altered formants bear resemblance to the vowel "aa" (as in "father"), and in reality, do sound like the vowel "u." More generally, the vibra-motor's frequency response exhibits this rough shape, thereby biasing the vowels to the sound of "aa" or "o."

Fortunately, the frequency response of the vibra-motor is only a function of the device and does not change with time (at least until there is wear and tear of the device). We tested this by computing the correlation of the Sine Sweep frequency response at various sound pressure levels; the correlation proved strong, except for a slight dip at the resonant frequencies due to the non-linearities. Knowing the frequency response, the disclosed system may apply an equalization technique, similar to channel equalization in communication. The system may estimate the inverse gain by computing the ratio of the coefficients from the microphone and the vibra-motor, and multiply the inverse gain with the frequency coefficients of the output signal.

More specifically, the custom hardware setup 200 or any smartphone setup 300 may use a reference microphone for calibration (blind calibration) for a type of vibra-motor, and then moving forward use that calibration on vibra-motors of the same type, so one would not have to repeat calibration at least for that type of vibra-motor. In one embodiment, the disclosed system, to perform frequency domain equalization on the time-frequency domain signal, is to: determine an inverse gain as a ratio between first frequency coefficients of a reference signal, received by a reference microphone, and second frequency coefficients of the back EMF signal; and multiply the inverse gain times a set of third frequency coefficients of the time-frequency domain signal.

Background Noise Removal

Deafness in vibra-motors implies that the motor's response to high frequency signals (e.g., greater than 2 KHz) is indistinguishable from noise. If this noise exhibits a statistical structure, a family of spectral subtraction algorithms may be employed to improve SNR. For example, the system may isolate voiced components in the time-frequency domain signal that are associated with a first harmonic frequency and apply spectral subtraction of known background noise to the voiced components, to generate a reduced-noise signal. To perform this function, however, two pre-processing steps may be performed. First, the pure noise segments in the signal may be recognized, so that statistical properties of the signal are modeled accurately. This means that noise segments are to be discriminated from speech. Second, within the speech segments, voiced and unvoiced components may also be separated so that spectral subtraction is applied on the voiced components. This is because unvoiced signals bear noise-like properties and spectral subtraction can be detrimental to the unvoiced signal.

To reliably discriminate the presence of speech segments, we exploit the exaggerated behavior in the resonance frequency band. We observe that speech brings out heavy resonance behavior in vibra-motors, while noise elicits a muted response. Thus, resonance may present an opportunity. Once speech is segregated from noise, the next step is to isolate the voiced components in speech. For this, the disclosed system leverages well-defined harmonic structure of human speech.

With further reference to the 2D matrix in FIG. 12, consider a time window and slide it up/down to compute an autocorrelation coefficient across different frequencies. Due to the repetition of the harmonics, the autocorrelation spikes periodically, yielding robust detection accuracy. When autocorrelation does not detect such periodic spikes, they are deemed as the unvoiced segments.

The final task of spectral subtraction is performed on the voiced signal alone. For a given voiced signal (e.g., a set of columns in the matrix), the closest noise segments in time are selected, and these noise segments are averaged over a modest time window, e.g., 300 to 400 milliseconds (ms) or other adequate time window. Put differently, for each frequency bin, the mean noise floor may be computed, and then subtracted from the corresponding bin in the voiced signal. For zero mean Gaussian noise, this does not offer any benefit; however, the noise is often not zero mean. In such cases, the SNR improves and alleviates the deafness.

FIG. 14A is a graphed output of the spectrogram of the spoken word "yes" before spectral subtraction of noise according to an embodiment. FIG. 14B is a graphed output of the spectrogram of the spoken word "yes" after spectral subtraction of noise according to an embodiment, e.g., illustrating a reduced noise signal. Note the significant improvement in the clarity of the output after spectral subtraction, particularly for frequencies over 500 Hz.

Detect Speech Energy Concentrations

Observe that noise removal described above brings the mean noise to zero (or approximately zero); however, noise still exists and the SNR is still not adequate. In other words, deafness may still be a problem. However, now that noise is zero mean and Gaussian, there is an opportunity to exploit its diversity to further suppress it. Localizing the speech signal energy in the spectrogram would be valuable, even if the exact signal is not recovered in this step.

In one embodiment, the disclosed system may average of the signals from within a frequency window (e.g., a length between about 10 to 20 Hz, 10 to 30 Hz, 20 or 30 Hz, or the similar frequency window), and slide the frequency window up to 10 kilohertz (KHz). Referring to the 2D matrix (FIG. 12), the system may compute the average of W elements in each column (W being the frequency window size), and slide the frequency window vertically. The same operation may be performed for each column or a group of columns. The averaging at each window may generate a complex frequency coefficient containing both the signal and the noise. In one embodiment, with sufficiently large W, the average converges to the average of the signal content in these elements since the (average) noise sum up to zero (or approximately zero). That said, if W is too large, than nearby frequencies are squeezed close together and detecting individual frequencies of energy concentration becomes more difficult.

Mathematically speaking, in one embodiment, if $C_i$ denotes the signal at frequency $f_i$ and $C_i = S_i + N_i$, where $S_i$ is the speech signal and $N_i$ the noise, then the averaged $C_i^*$ may be computed as:

$$C_i^* = \frac{1}{W} \sum_{f=i-\frac{W}{2}}^{i+\frac{W}{2}} C_i = \frac{1}{W} \sum_{f=i-\frac{W}{2}}^{i+\frac{W}{2}} S_i + \frac{1}{W} \sum_{f=i-\frac{W}{2}}^{i+\frac{W}{2}} N_i \qquad (1)$$

which is a time-frequency correlation formula. Since the term $\Sigma N_i$ is zero mean Gaussian, it approaches zero for larger W, while the $$\frac{1}{W} \sum S_i$$

term is simple smoothing. For each frequency bin, the system may normalize the $C_i^*$ values over a time window so that they range between zero and one [0:1]. The result is a 3D contour map, where the locations of higher elevations, e.g., hills, indicate the presence of speech signals. The system may identify the dominant hills of the speech energy concentration and zero out speech energy in time-frequency areas outside the areas of speech energy concentration identified within the reduced-noise signal. This is because speech signals exhibit a large time-frequency footprint, since human voice is not capable of producing sounds that are narrow in frequency and time.

FIG. 15A is a graphed output of the raw audio signal from the vibra-motor according to an embodiment. FIG. 15B is a graphed output the speech energy concentration, which makes the audio signal energy from the vibra-motor visible through a heat-map-like contour according to an embodiment. Note the brighter (yellow in original) areas indicating the areas of speech energy concentration, which may be associated with particular letters or words. FIG. 15C is a graphed output of the corresponding speech signal as detected by the microphone according to an embodiment. Note that this corresponding speech signal from the microphone signal bears close resemblance to contoured images of FIG. 15B, e.g., the areas of greatest speech energy concentration coincide.

Partial Speech Synthesis

Once the vibra-motor output has been pre-processed and speech energy concentration identified, the structure of speech can now be leveraged for signal recovery.

Voice Source Expansion

After detecting speech energy concentrations, the system knows the location of speech energy (in time-frequency domain), but the system does not know the speech signal. In attempting to recover this signal, the system may exploit the knowledge that the fundamental frequencies in speech actually manifest in higher frequency harmonics. Therefore, knowledge of the lower fundamental frequencies may be expanded to reconstruct the higher frequencies. Unfortunately, the actual fundamental frequency often gets distorted by the resonant bands.

As a workaround, the system may employ the relatively high SNR signals in the range of 250 to 2000 Hz to synthesize the voice source signal at higher frequencies. Synthesis may be achieved through careful replication. Specifically, the disclosed algorithm may copy the coefficient $C_{t,f}$, where t is the time segment and f is the frequency bin of the time-frequency signal, and add the coefficient to $C_{t,kf}$ for all integer, k, such that kf is less than the Nyquist frequency. Here, integer k may indicate the harmonic number for the frequency, f. Intuitively, the system copies the frequency harmonics from the reliable range, and replicates these harmonics at the higher frequencies.

Figure 16A:
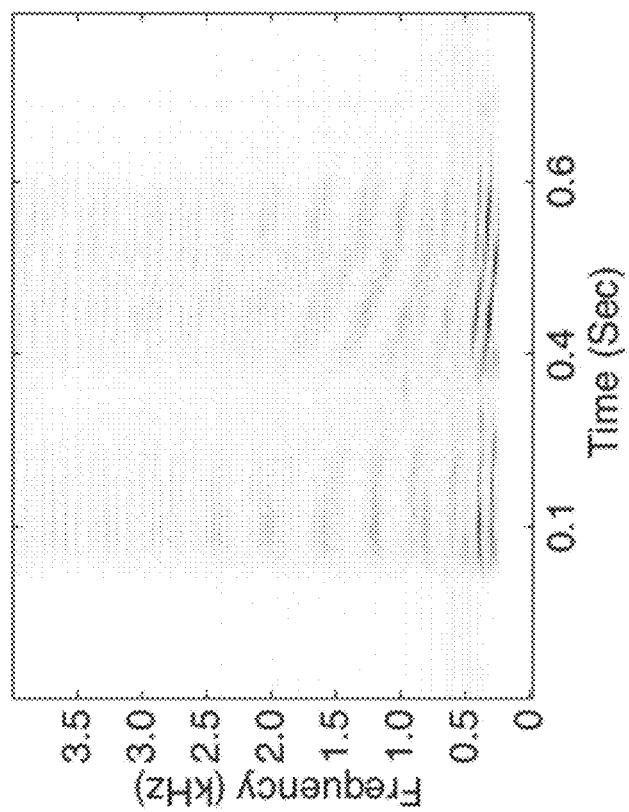
FIG. 16A is a graphed output illustrating the result of source expansion for the voiced signal components of the raw vibra-motor audio signal according an embodiment.
Figure 16B:
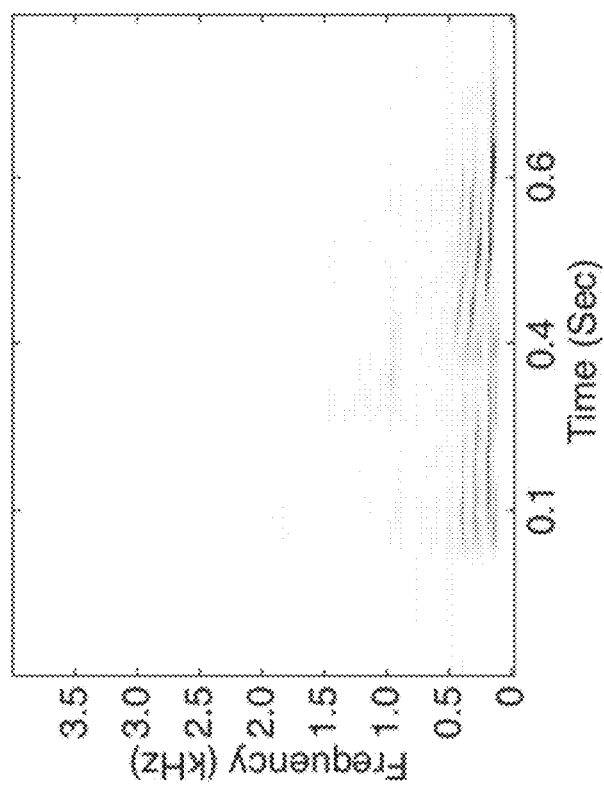
FIG. 16B is a graphed output illustrating the result of source expansion for the voiced signal components of the raw vibra-motor audio signal after harmonic replication according to an embodiment.

FIG. 16A is a graphed output illustrating the result of source expansion for the voiced signal components of the raw vibra-motor audio signal according an embodiment. FIG. 16B is a graphed output illustrating the result of source expansion for the voiced signal components of the raw vibra-motor audio signal after harmonic replication according an embodiment. Note that the harmonic replication synthesizes the voiced components, as the harmonic frequencies are only present in the voiced signals. For unvoiced signals, the system may blindly replicate unvoiced data to a number of higher frequencies without regard for which are harmonics and which are not, to fill in the remainder of the speech signal at higher frequencies. This replication may result in an expanded voice source signal, an example of which is illustrated in FIG. 16B.

Speech Reconstruction

Recall that the mouth and nasal cavities modulate the air vibrations, which may be modeled as weights multiplied to the fundamental frequencies and their harmonics. While the system does not know the values of these weights, the location of the energies, computed from the 3D contour hills, may be estimated. The system may now utilize this location estimate as an energy mask. As a first step, the system may apply an exponential decay function along the multiple harmonic frequencies (e.g., of a frequency axis) of the expanded voice source signal to generate a modified voice source signal that models the low intensity of natural speech, but at the higher frequencies. Then the energy mask is multiplied with this modified signal, emulating an adaptive gain filter. In other words, the system may next apply the speech energy concentration as an energy mask to the modified voice source signal, to generate a resultant time-frequency domain signal. As this also improves the SNR of the unvoiced section of the speech, the system may apply a deferred spectral subtraction method on these segments to further remove the background noise, to generate a resultant reduced-noise signal. Finally, the system may convert this resultant reduced noise signal to the time domain using inverse short time Fourier transform (ISTFT).

FIG. 17A is a graphed output of the audio for the word "often" as manifested in the raw vibra-motor audio signal according to an embodiment. FIG. 17B is a graphed output of the audio for the word "often" after the disclosed processing according to an embodiment. FIG. 17C is a graphed output of the audio for the word "often" captured as a microphone signal according to an embodiment. Note how much closer the processed audio output of FIG. 17B is to the actual microphone output illustrated in FIG. 17B, when compared with the original raw vibra-motor audio signal (FIG. 17A). When played through a speaker or the like, the processed output of FIG. 17B may be detected as words and understood as words, similarly to the detection by the microphone (FIG. 17C).

Evaluation

Above are described two experimentation platforms for the disclosed system, namely the custom hardware setup 200 and the Samsung® Galaxy smartphone setup 300. In both cases, we evaluate the system's speech intelligibility against the performance of the corresponding microphone. In the custom hardware, the microphone is positioned right next to the vibra-motor, while in the smartphone, their locations are modestly separated. We generate the speech signals using a text-to-speech (TTS) utility available in OS X 10.9, and play them at different volumes through a loudspeaker. The position/volume of the loudspeaker is adjusted such that the sound pressure levels at the vibra-motor and the microphone are equal. The accent and intonation of the TTS utility also does not affect the experiment since both the vibra-motor and the microphone hear the same TTS speech. The content of the speech is drawn from Google'S® Trillion Word Corpus, we picked 2000 of the most frequent words, which is prescribed as a good benchmark in literature.

Automatic Speech Recognition (ASR)

In ASR, a software programmatically converts the time domain speech signal to text. ASR tools may have three distinct components: (a) an acoustic model, (b) a pronunciation dictionary, and (c) a language model. The acoustic model may be a trained statistical model (e.g., Hidden Markov Model (HMM), Neural Networks, or the like) that maps segments of the input waveform to a sequence of phonemes. These phonemes are then located in the pronunciation dictionary, which lists the candidate words (along with their possible pronunciations) based on the matching phoneme sequence. Among these candidates, the most likely output is selected using a grammar or a language model.

The ASR tools included the open-source Sphinx4 (pre-alpha version) library published by CMU. The acoustic model is sensitive to the recording parameters, including the bandwidth and the features of the microphone. Such parameters do not apply to vibra-motors, so we used a generic acoustic model trained with standard microphone data. This is not ideal for the vibra-motor, and hence, the reported results are perhaps a slight under-estimate of the disclosed system's capabilities when using the vibra-motor as a sound or audio sensor.

Manual Speech Recognition (MSR)

We recruited a group of six volunteers from our department building, one native English speaker, one Indian faculty with English as first language, two Indian PhD students, and two Chinese PhD students. We played the vibra-motor and microphone outputs to the participants simultaneously and collected their responses. In some experiments, volunteers were asked to guess the word or phrase from the playback; in other experiments, the volunteers were given a list of phrases and asked to pick the most likely one, including the option of "none of the above." Human responses were accompanied by a subjective clarity score, where each volunteer expressed how intelligible the word was, even when he/she could not guess with confidence. Finally, in some experiments, volunteers were asked to guess first, and then guess again based on a group discussion. Such discussions served as a "prior" for speech recognition, and often the group consensus was different from the first individual guess.

Metrics

Across the experiments, 9 hours of sound was recorded and a total of 20,000 words were tested with ASR at various sound pressure levels (measured in dbSPL). For MSR, a total of 300 words and 40 phrases were played, resulting in more than 2000 total human responses. We report "Accuracy" as the percentage of words/phrases that were correctly guessed, and show its variation across different loudness levels (measured in dBSPL). We report "Perceived Clarity" as a subjective score reported by individuals, even when they did not decode the word with confidence. Finally, we report "Precision," "Recall," and "Fallout" for experiments in which the users were asked to select from a list. Recall that precision intuitively refers to "what fraction of your guesses were correct," and recall intuitively means "what fraction of the correct answers did you guess." We now present the graphs, beginning with ASR.

Performance Results with ASR

FIG. 18A is a graphed output illustrating automatic recognition accuracy as a function of loudness for the custom hardware setup 200 of FIG. 2 according to an embodiment. For the results in FIG. 18(a), the accuracy with ASR is graphed as a function of the sound pressure level (dbSPL), a standard metric proportionally related to the loudness of the sound. The accuracy, when listening with the vibra-motor, is around 88% at 80 dbSPL, which is equivalent to the sound pressure experienced by the smartphone's microphone during typical (against the ear) phone call. The microphone's accuracy is predictably better at 95%, while the raw vibra-motor signal performs poorly at 43% (almost half of that after vibra-motor audio output processing). Importantly, the pre-processing and the synthesis gains are individually small, but since intelligibility is defined as binary metric here, the improvement jumps up when applied together.

Once the loudness decreases at 60 dbSPL, comparable to a normal conversation one meter away from the microphone, the disclosed system's accuracy drops to 60%. At lower sound pressure level, the accuracy drops faster since the vibra-motor's sensitivity is inadequate for detecting the air vibrations. However, the accuracy can be improved with training the acoustic model with vibra-motors (recall that with ASR, the training is performed through microphones, which is unfavorable to processing vibra-motor outputs).

FIG. 18A is a graphed output illustrating automatic recognition accuracy as a function of loudness for the smartphone setup 300 of FIG. 3 according to an embodiment. Performance from the smartphone setup 300 is weaker compared to the custom hardware setup 200, although the difference is marginal: the ASR output is still at 80% and 80 dbSPL. Admittedly, although we are not exactly sure of the reason for this difference, we conjecture that the smartphone signal processing pipeline may not be as tuned to the vibra-motor like we have done in the custom case.

The accuracy results above counts perfect matches between ASR's output and the actual spoken word, not imperfect ones. In certain applications, a list of possible words may also be useful, particularly when the quality of the speech is poor. We record the list of the predictions from ASR for each spoken word, played at 50 dbSPL. FIG. 19 is a graphed output illustrating the cumulative distribution function (CDF) of word rank from prediction from automatic speech recognition (ASR) prediction at 50 dbSPL for the custom hardware setup 200 of FIG. 2 according to an embodiment. FIG. 19 plots the CDF of the rank of the correct word in this list. At this relatively softer 50 dbSPL experiment, only if 20% of the words are ranked at one ("1"), implying exact match. In 41% of the cases, the words were within top five of the list, and top ten presents a 58% accuracy.

The acoustic model we used with ASR is not ideal for the system using the vibra-motor, as the impact is pronounced for distorted phonemes. A phoneme is a perceptually distinct unit of sound in a specified language that distinguishes one word from another word. Training ASR's acoustic model with the vibra-motor response is expected to offer improvements, but in the absence of that, we report a subjective overview of the entropy in different phonemes recorded by the disclosed system. In other words, we determine whether autocorrelation between the same phonemes is high and cross correlation across phonemes are low. We extract the STFT coefficients of the 100 phonemes (28 vowels and 72 consonants) from the International Phoneme Alphabet and use these coefficients as the features. We then calculate correlation coefficient of the pairs of phonemes in the list.

Figure 20B:
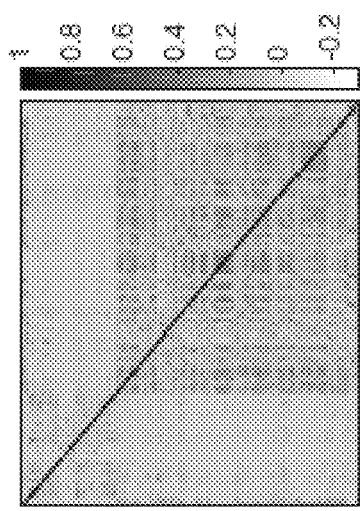
FIG. 20B is heat map output illustrating the correlation of the frequency domain features of the phoneme sounds, recorded with the custom vibration motor of FIG. 2 after processing according to an embodiment.
Figure 20A:
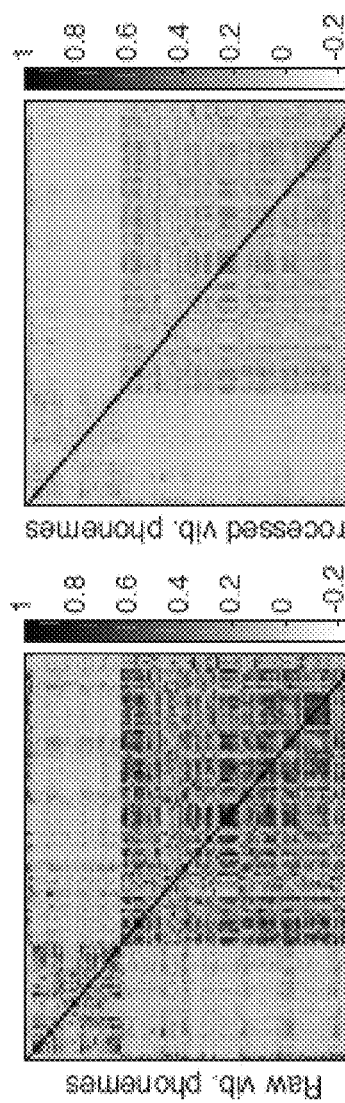
FIG. 20A is heat map output illustrating the correlation of the frequency domain features of the phoneme sounds, recorded with the custom vibration motor of FIG. 2 before processing according to an embodiment.

FIG. 20A is heat map output illustrating the correlation of the frequency domain features of the phoneme sounds, recorded with the custom vibration motor of FIG. 2 before processing according to an embodiment. With relation to the heat-map type image of FIG. 20A, the distorted phonemes bear substantial similarity between each other, indicated by the multiple dark off-diagonal blocks. The two large darker squares in the figure represent the pulmonic (58 phonemes) and non-pulmonic (14 phonemes) consonant groups.

FIG. 20B is heat map output illustrating the correlation of the frequency domain features of the phoneme sounds, recorded with the custom vibration motor of FIG. 2 after processing according to an embodiment, which reflects substantial improvements. The autocorrelation is strong across the diagonal of the matrix, while the off-diagonal elements are much less correlated. This extends hope that a vibra-motor-trained acoustic model may appreciably boost the disclosed system's speech detection performance.

Performance Results with MSR

Figure 21:
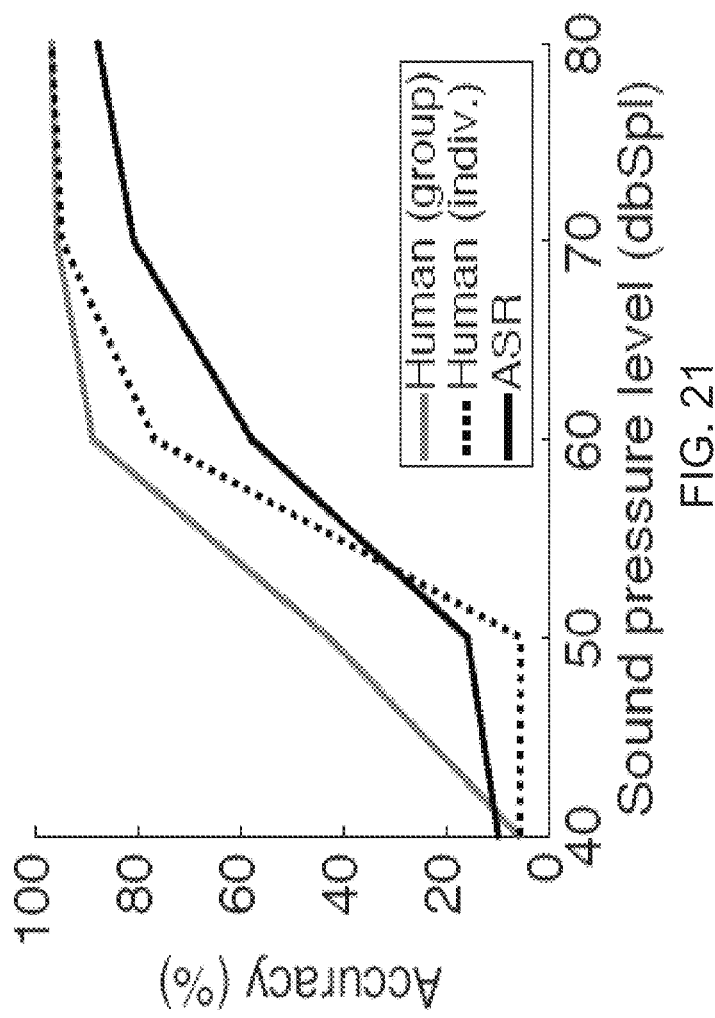
FIG. 21 is a plot that compares the accuracy of human decoding with automatic speech recognition (ASR).

FIG. 21 is a plot that compares the accuracy of human decoding (e.g., MSR) with automatic speech recognition (ASR). Unsurprisingly, the accuracy is around 20% more than ASR at higher loudness regimes (60 dbSPL or more), as the individuals guessed the words individually in these experiments. Using consensus from group discussion, the accuracy increases to 88% at 60 dbSPL. When the loudness is stronger, vibra-motor-based detection is comparable to microphone detection, both for custom hardware and smartphones.

FIG. 22A is a bar graph illustrating the accuracy, precision, recall, and fall-out values for manual hot-phrase detection using the custom vibra-motor hardware setup 200 of FIG. 2 according to an embodiment. FIG. 22B is a bar graph illustrating the accuracy, precision, recall, and fall-out values for manual hot-phrase detection using the smartphone setup 300 of FIG. 3 according to an embodiment. Here, each volunteer was asked to pick a phrase (e.g., "hot phrase") from the list that best matched the spoken phrase, where the volunteer could also select none of the phrases. We provided a list of 10 written phrases before playing the positive and negative samples in arbitrary sequence. Example phrases were "turn left," "happy birthday," "start the computer," and the like, and the negative samples were chosen with comparable number of words and characters.

The bar graph of FIG. 22A reports results from the custom hardware, where volunteers almost perfectly identified the phrases and rejected the negative samples. However, when using the smartphone vibra-motor, the disclosed processing failed to identify some positive samples. The bar graph in FIG. 22B illustrates the outcome in relatively higher false negative values. Of course, the degradation is relative: the absolute detection performance is still quite high, with accuracy and precision at 0.83 and 0.90, respectively, for the processed vibration signal.

Human volunteers also assigned a "clarity score" on a range of [0; 10] to each word/phrase to which he/she listened, where a score of 10 indicated a perfectly intelligible word. FIG. 23 is a bar graph illustrating the perceived clarity of the correctly decoded speech recorded with microphone and vibration motor according to an embodiment. The bar graph plots the average clarity score of the correctly decoded samples and compares it between the vibration motor and the microphone. The subjective perception of clarity does not change for the microphone for sound pressure levels 50 dbSPL and above. While the disclosed system's clarity is lower than microphone in general, the gap reduces at higher loudness levels. At 80 dbSPL, the perceived clarity scores for microphones and vibration signals are 9:1 and 7:6, respectively.

FIG. 24A is a collage of the top 10 words that are correctly decoded by ASR according to an embodiment. FIG. 24B is a collage of the top 10 words that are incorrectly decoded by ASR according to an embodiment. The font size is proportional to the decoding accuracy, indicating that "international" was decoded correctly most frequently, while prepositions like "a," "and," and "or" were consistently missed. Unsurprisingly, longer words are decoded with higher accuracy because of better interpolation between the partially decoded phonemes.

FIG. 25A is a graph illustrating ASR accuracy for long (greater than six characters) and short (less than or equal to six characters) words as a function of loudness according to an embodiment. FIG. 25B is a graph illustrating manual speech recognition (MSR) accuracy for long (greater than six characters) and short (less than or equal to six characters) words as a function of loudness according to an embodiment. Note that words with five or more characters are mostly multi-syllable and therefore yielded improved recognition.

TABLE 1

| | Coupling Sensitivity Data | | | | | | | |
|---|---|---|---|---|---|---|---|---|
| User | A | B | C | D | E | F | G | H |
| Error(%) | 8 | 0 | 0 | 8 | 0 | 0 | 17 | 25 |
| Score | 8 | 8 | 6 | 6 | 4 | 3 | 3 | 3 |

Electromagnetic Coupling

Table 1 summarizes the manual speech recognition performance for an electromagnetic coupling test. In this micro-benchmark, we remove the equipment (microphone, speaker, etc.) from the test environment that can potentially create electromagnetic coupling with the vibration motor. The signal recorded in this micro-benchmark does not show any quantitative difference from that of our standard test environment. However, we run a manual speech recognition test on these recordings to identify possible perceptual differences in manual speech recognition. Here, the volunteers transcribe the voice of a male non-native speaker recorded with a vibration motor during the micro-benchmark test. In this test, the volunteers individually listen to the recordings at sound levels according to their personal preferences. The percentage of the incorrect words in the transcription and the perceived quality score given by each user are shown in Table 1. The perceived sound quality is consistent with our previous results at 60 dbSPL, the natural loudness of the speaker's voice at three feet from the recording device.

We observed that when vibra-motors are pasted to walls and floors, and music is being played in the adjacent rooms, the disclosed system is able to detect these sounds better than the microphone. We also observed that by placing the vibra-motor on the throat, various speech components can be detected, and in some cases, compliments the response of the microphone. Finally, we find that noise properties of vibra-motors and microphones are uncorrelated, enabling the possibility of diversity combining, e.g., they could together behave like a MIMO system, improving the capacity of acoustic channels.

Figure 26:
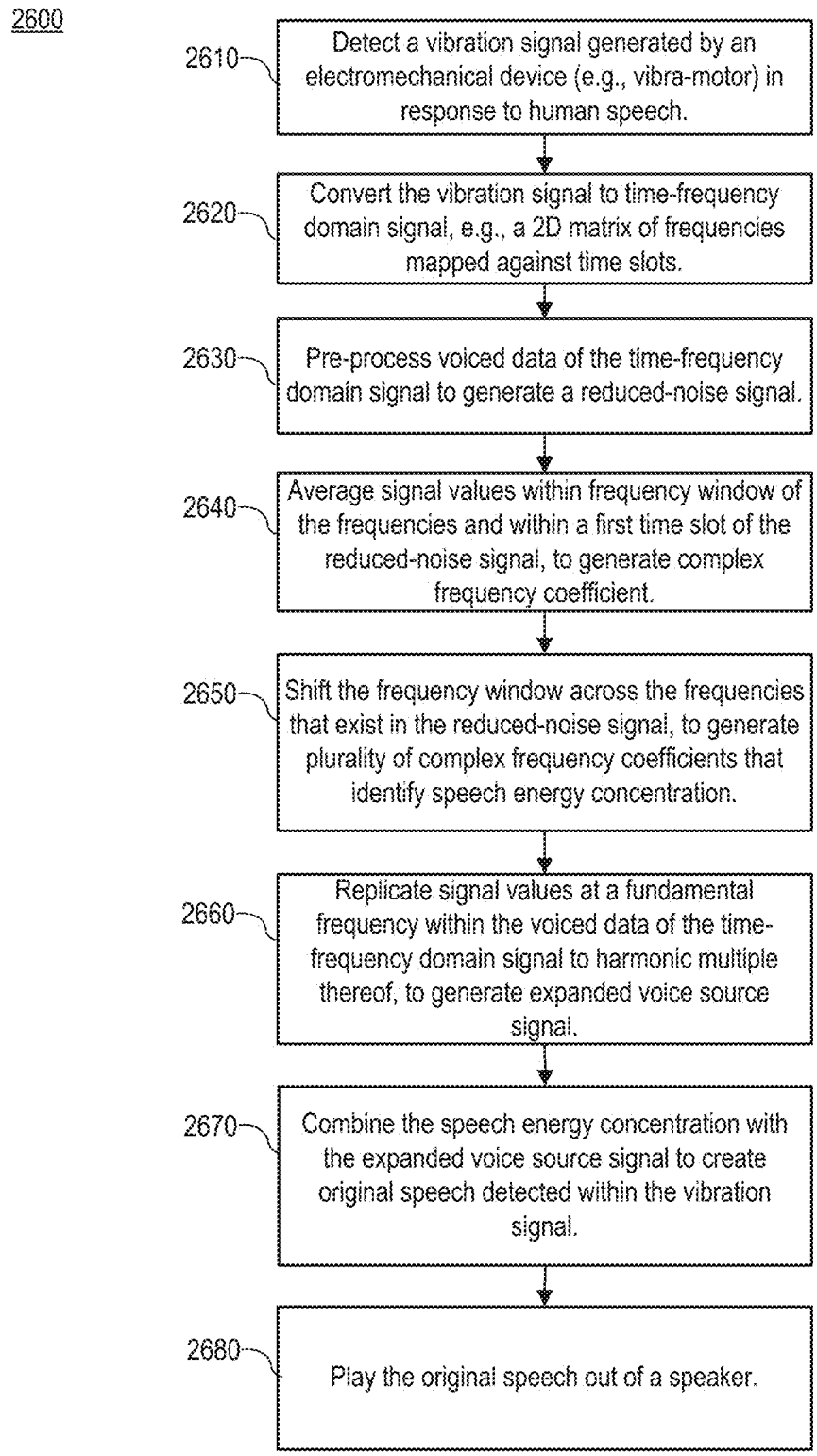
FIG. 26 is a flow chart of a method for processing a vibration signal to generate original speech detected within the vibration signal according to an embodiment

FIG. 26 is a flow chart of a method 2600 for processing a vibration signal to generate original speech detected within the vibration signal according to an embodiment. The method 2600 may be performed by processing logic that may comprise hardware (e.g., circuitry, dedicated logic, programmable logic, microcode, etc.), software (such as instructions running on the processor), firmware or a combination thereof. In various embodiments, a processing device of the system 100, of the custom hardware setup 200, of the smartphone setup 300, or of the computer system 2800 (FIG. 28) performs the method 2600. Alternatively, other components of a computing device may perform some or all of the operations of the method 2600.

With reference to FIG. 26, the method 2600 may begin with the processing device, which is coupled to an electromechanical device, detecting a vibration signal generated by the electromechanical device in response to human speech (2610). In one embodiment, the electromechanical device is a vibra-motor. The method 2600 may continue with the processing device converting the vibration signal to a time-frequency domain signal, which may be instantiated as a two-dimensional matrix of a plurality of frequencies mapped against a plurality of time slots (2620). The method 2600 may continue with the processing device pre-processing voiced data of the time-frequency domain signal to generate a reduced-noise signal (2630). The method 2600 may continue with the processing device averaging signal values within a frequency window of the plurality of frequencies, and that exist at a first time slot of the plurality of time slots, of the reduced-noise signal to generate a complex frequency coefficient (2640). The method 2600 may continue with processing device shifting the frequency window across the plurality of frequencies that exist in the reduced-noise signal at the first time slot, to generate a plurality of complex frequency coefficients that identify speech energy concentration within the reduced-noise signal (2650). In various embodiments, to average the signal values, the processing device further averages the signal values of the reduced-noise signal within the frequency window that exist over a time window made up of a subset of the plurality of time slots. The processing device may further shift the time window across the plurality of time slots while shifting the frequency window across the plurality of frequencies to generate the plurality of complex frequency coefficients.

The method 2600 may continue with the processing device replicating signal values at a fundamental frequency within the voiced data of the time-frequency domain signal to one or more harmonic multiple of the fundamental frequency, to generate an expanded voice source signal of the time-frequency domain signal (2660). The method 2600 may continue with the processing device combining the speech energy concentration with the expanded voice source signal to recreate original speech detected within the vibration signal (2670). The method 2600 may complete with the processing device playing the original speech out of a speaker or the like (2680).

Figure 27:
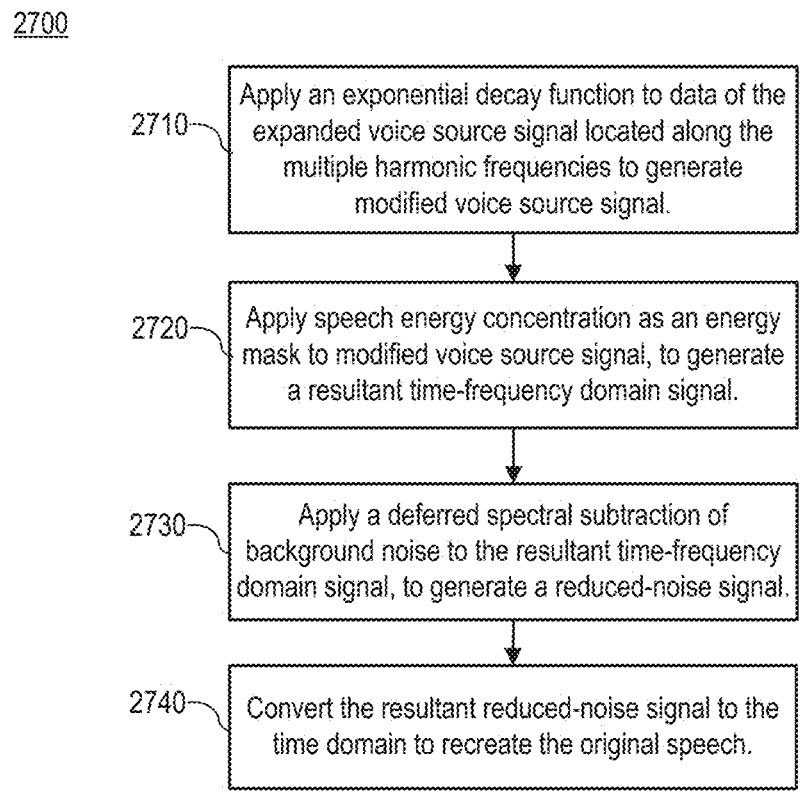
FIG. 27 is a flow chart of a method for combining speech energy concentration with an expanded voice source signal to generate original speech detected within the vibration signal according to an embodiment.

FIG. 27 is a flow chart of a method 2700 for combining speech energy concentration with an expanded voice source signal to generate original speech detected within the vibration signal according to an embodiment. The method 2700 may be performed by processing logic that may comprise hardware (e.g., circuitry, dedicated logic, programmable logic, microcode, etc.), software (such as instructions running on the processor), firmware or a combination thereof. In various embodiments, a processing device of the system 100, of the custom hardware setup 200, of the smartphone setup 300, or of the computer system 2800 (FIG. 28) performs the method 2700. Alternatively, other components of a computing device may perform some or all of the operations of the method 2600.

With reference to FIG. 27, the method 2700 may begin with the processing device applying an exponential decay function to data of the expanded voice source signal located along the multiple harmonic frequencies to generate a modified voice source signal (2710). The method 2700 may continue with the processing device applying the speech energy concentration as an energy mask to the modified voice source signal, to generate a resultant time-frequency domain signal (2720). The method 2700 may continue with the processing device applying a deferred spectral subtraction of background noise to the resultant time-frequency domain signal, to generate a resultant reduced-noise signal (2730). The method 2700 may continue with the processing convert the resultant reduced-noise signal to the time domain to recreate the original speech (2740).

Figure 28:
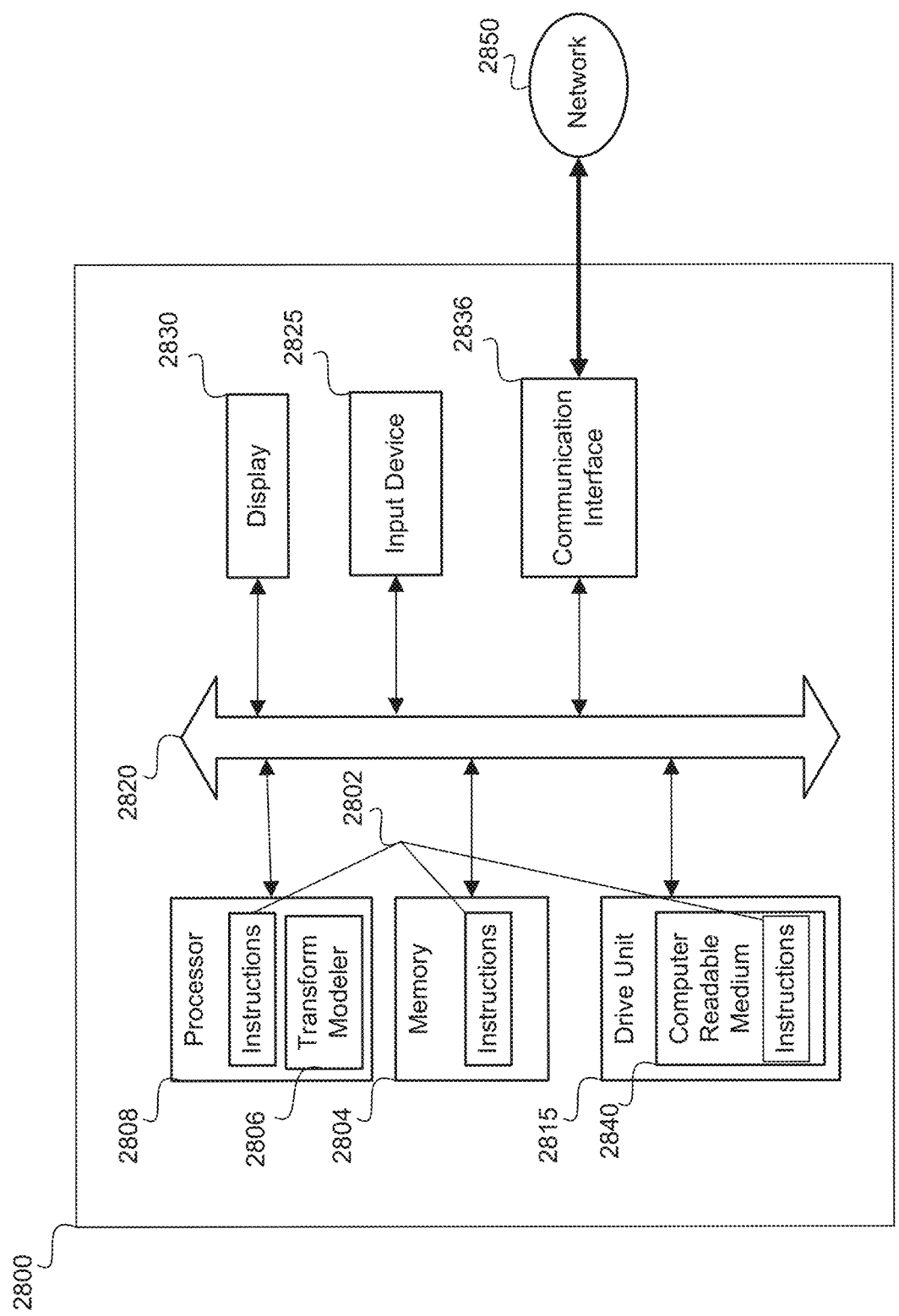
FIG. 28 is a computing system that may be used for speech detection with vibration signals according to the embodiments disclosed herein.

FIG. 28 illustrates a computer system 2800, which may represent aspects of the system 100, of the custom hardware setup 200, or of the smartphone setup 300 or any other device or system to which is referred or which is capable of executing the embodiment as disclosed herein. The computer system 2800 may include an ordered listing of a set of instructions 2802 that may be executed to cause the computer system 2800 to perform any one or more of the methods or computer-based functions disclosed herein. The computer system 2800 may operate as a stand-alone device or may be connected to other computer systems or peripheral devices, e.g., by using a network 2810.

In a networked deployment, the computer system 2800 may operate in the capacity of a server or as a client-user computer in a server-client user network environment, or as a peer computer system in a peer-to-peer (or distributed) network environment. The computer system 2800 may also be implemented as or incorporated into various devices, such as a personal computer or a mobile computing device capable of executing a set of instructions 2802 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 2800 may include a memory 2804 on a bus 2820 for communicating information. Code operable to cause the computer system to perform any of the acts or operations described herein may be stored in the memory 2804. The memory 2804 may be a random-access memory, read-only memory, programmable memory, hard disk drive or any other type of volatile or non-volatile memory or storage device.

The computer system 2800 may include a processor 2808 (e.g., a processing device), such as a central processing unit (CPU) and/or a graphics processing unit (GPU). The processor 2808 may include one or more general processors, digital signal processors, application specific integrated circuits, field programmable gate arrays, digital circuits, optical circuits, analog circuits, combinations thereof, or other now known or later-developed devices for analyzing and processing data. The processor 2808 may implement the set of instructions 2802 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The processor 2808 may include a transform modeler 2806 or contain instructions for execution by a transform modeler 2806 provided a part from the processor 2808. The transform modeler 2806 may include logic for executing the instructions to perform the transform modeling and image reconstruction as discussed in the present disclosure.

The computer system 2800 may also include a disk (or optical) drive unit 2815. The disk drive unit 2815 may include a non-transitory computer-readable medium 2840 in which one or more sets of instructions 2802, e.g., software, can be embedded. Further, the instructions 2802 may perform one or more of the operations as described herein. The instructions 2802 may reside completely, or at least partially, within the memory 2804 and/or within the processor 2808 during execution by the computer system 2800.

The memory 2804 and the processor 2808 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 2800 may include an input device 2825, such as a keyboard or mouse, configured for a user to interact with any of the components of the computer system 2800. It may further include a display 2830, such as a liquid crystal display (LCD), a cathode ray tube (CRT), or any other display suitable for conveying information. The display 2830 may act as an interface for the user to see the functioning of the processor 2808, or specifically as an interface with the software stored in the memory 2804 or the drive unit 2815.

The computer system 2800 may include a communication interface 2836 that enables communications via the communications network 2810. The network 2810 may include wired networks, wireless networks, or combinations thereof. The communication interface 2836 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. A device comprising:
   a metal coil made of a number of turns;
   a magnetic mass to move past the number of turns of the metal coil in response to vibrations from human speech, to generate a reverse electromotive force ("back EMF") signal within the metal coil;
   an amplifier circuit coupled to the metal coil to generate, from the back EMF signal, a vibration signal; and
   a processing device coupled to the amplifier circuit, the processing device to:
   convert the vibration signal to a time-frequency domain signal, which comprises a two-dimensional matrix of a plurality of frequencies mapped against a plurality of time slots;
   pre-process voiced data of the time-frequency domain signal, to generate a reduced-noise signal;
   average signal values within a frequency window of the plurality of frequencies, and that exist at a first time slot of the plurality of time slots, of the reduced-noise signal to generate a complex frequency coefficient;
   shift the frequency window across the plurality of frequencies that exist in the reduced-noise signal at the first time slot, to generate a plurality of complex frequency coefficients that identify speech energy concentration within the reduced-noise signal;
   replicate signal values at a fundamental frequency within the voiced data of the time-frequency domain signal to one or more harmonic multiple of the fundamental frequency, to generate an expanded voice source signal of the time-frequency domain signal; and
   combine the speech energy concentration with the expanded voice source signal to recreate original speech detected within the back EMF signal.

2. The device of claim 1, wherein the metal coil and the magnetic mass are located within a vibration motor.

3. The device of claim 1, wherein the frequency window is one of a first length between 10 and 20 hertz or a second length that causes remaining noise within the frequency window to average to approximately zero, and wherein the frequency window is shifted up to 10 kilohertz of the reduced-noise signal.

4. The device of claim 1, wherein the processing device, to perform frequency domain equalization on the time-frequency domain signal, is further to:
   determine an inverse gain as a ratio between first frequency coefficients of a reference signal, received by a reference microphone, and second frequency coefficients of the back EMF signal; and
   multiply the inverse gain times a set of third frequency coefficients of the time-frequency domain signal.

5. The device of claim 1, wherein to pre-process the voiced data of the time-frequency domain signal, the processing device is to:
   isolate voiced components in the time-frequency domain signal that are associated with a first harmonic frequency; and
   apply spectral subtraction of known background noise to the voiced components, to generate the reduced-noise signal.

6. The device of claim 1, wherein to average the signal values, the processing device is further to average the signal values of the reduced-noise signal within the frequency window that exist over a time window comprising a subset of the plurality of time slots, and wherein the processing device is further to shift the time window across the plurality of time slots while shifting the frequency window across the plurality of frequencies to generate the plurality of complex frequency coefficients.

7. The device of claim 6, wherein to average the signal values, the processing device is further to normalize signal values, which exist at each frequency of the plurality of frequencies, as between zero ("0") and one ("1") across the time window, and wherein the time window is between 300 and 400 milliseconds.

8. The device of claim 1, wherein the processing device is further to zero out speech energy located outside of time-frequency areas of the speech energy concentration identified within the reduced-noise signal.

9. The device of claim 1, wherein the processing device is further to:
   replicate the signal values at the fundamental frequency within the voiced data of the time-frequency domain signal to multiple harmonic frequencies of the fundamental frequency;
   identify unvoiced data within the time-frequency domain signal; and
   replicate the unvoiced data to a plurality of higher frequencies to complete the expanded voice source signal.

10. The device of claim 1, wherein, to combine the speech energy concentration with the expanded voice source signal, the processing device is to:
- apply an exponential decay function to data of the expanded voice source signal located along the one or more harmonic multiple of the fundamental frequency to generate a modified voice source signal;
- apply the speech energy concentration as an energy mask to the modified voice source signal, to generate a resultant time-frequency domain signal;
- apply a deferred spectral subtraction of background noise to the resultant time-frequency domain signal, to generate a resultant reduced-noise signal; and
- convert the resultant reduced-noise signal to the time frequency domain to recreate the original speech.

11. A method comprising:
- detecting, using a processing device coupled to an electromechanical device, a vibration signal generated by the electromechanical device in response to human speech;
- converting, by the processing device, the vibration signal to a time-frequency domain signal, which comprises a two-dimensional matrix of a plurality of frequencies mapped against a plurality of time slots;
- pre-processing, by the processing device, voiced data of the time-frequency domain signal to generate a reduced-noise signal;
- averaging, by the processing device, signal values within a frequency window of the plurality of frequencies, and that exist at a first time slot of the plurality of time slots, of the reduced-noise signal to generate a complex frequency coefficient;
- shifting, by the processing device, the frequency window across the plurality of frequencies that exist in the reduced-noise signal at the first time slot, to generate a plurality of complex frequency coefficients that identify speech energy concentration within the reduced-noise signal;
- replicating, by the processing device, signal values at a fundamental frequency within the voiced data of the time-frequency domain signal to one or more harmonic multiple of the fundamental frequency, to generate an expanded voice source signal of the time-frequency domain signal; and
- combining, by the processing device, the speech energy concentration with the expanded voice source signal to recreate original speech detected within the vibration signal.

12. The method of claim 11, further comprising playing the original speech out of a speaker coupled to the processing device.

13. The method of claim 11, wherein the frequency window is one of a first length between 10 and 20 hertz or a second length that causes remaining noise within the frequency window to average to approximately zero, and wherein the frequency window is shifted up to 10 kilohertz of the reduced-noise signal.

14. The method of claim 11, further comprising:
- determining an inverse gain as a ratio between first frequency coefficients of a reference signal, received by a reference microphone, and second frequency coefficients of the vibration signal; and
- multiplying the inverse gain times a set of third frequency coefficients of the time-frequency domain signal, to perform frequency domain equalization on the time-frequency domain signal.

15. The method of claim 11, wherein pre-processing the voiced data of the time-frequency domain signal comprises:
- isolating voiced components in the time-frequency domain signal that are associated with a first harmonic frequency; and
- applying spectral subtraction of known background noise to the voiced components, to generate the reduced-noise signal.

16. The method of claim 11, wherein averaging the signal values further comprises averaging the signal values of the reduced-noise signal within the frequency window that exist over a time window comprising a subset of the plurality of time slots, the method further comprising shifting the time window across the plurality of time slots while shifting the frequency window across the plurality of frequencies to generate the plurality of complex frequency coefficients.

17. The method of claim 16, wherein averaging the signal values further comprises normalizing the signal values, which exist at each frequency of the plurality of frequencies, as between zero ("0") and one ("1") across the time window, and wherein the time window is between 300 and 400 milliseconds.

18. The method of claim 11, further comprising zeroing out speech energy located outside of time-frequency areas of the speech energy concentration identified within the reduced-noise signal.

19. The method of claim 11, further comprising:
- replicating the signal values at the fundamental frequency within the voiced data of the time-frequency domain signal to multiple harmonic frequencies of the fundamental frequency;
- identifying unvoiced data within the time-frequency domain signal; and
- replicating the unvoiced data to a plurality of higher frequencies to complete the expanded voice source signal.

20. The method of claim 11, wherein combining the speech energy concentration with the expanded voice source signal comprises:
- applying an exponential decay function to data of the expanded voice source signal located along the one or more harmonic multiple of the fundamental frequency to generate a modified voice source signal;
- applying the speech energy concentration as an energy mask to the modified voice source signal, to generate a resultant time-frequency domain signal;
- applying a deferred spectral subtraction of background noise to the resultant time-frequency domain signal, to generate a resultant reduced-noise signal; and
- converting the resultant reduced-noise signal to the time frequency domain to recreate the original speech.

21. A system comprising:
- a vibration motor comprising a metal coil and a magnetic mass to move through the metal coil in response to vibrations from human speech, which generates a reverse electromotive force ("back EMF") signal within the metal coil;
- an analog-to-digital converter (ADC) coupled to the metal coil to convert the back EMF signal into a vibration signal;
- an amplifier coupled to the ADC to amplify the vibration signal into an amplified vibration signal; and
- a processing device coupled to the amplifier, the processing device to:
  - convert the amplified vibration signal to a time-frequency domain signal, which comprises a two-dimensional matrix of a plurality of frequencies mapped against a plurality of time slots;

pre-process voiced data of the time-frequency domain signal, to generate a reduced-noise signal;

average signal values within a frequency window of the plurality of frequencies, and that exist at a first time slot of the plurality of time slots, of the reduced-noise signal to generate a complex frequency coefficient, wherein the frequency window is of a length that remaining noise within the frequency window is to average to approximately zero;

shift the frequency window across the plurality of frequencies that exist in the reduced-noise signal at the first time slot, to generate a plurality of complex frequency coefficients that identify speech energy concentration within the reduced-noise signal;

replicate signal values at a fundamental frequency within the voiced data of the time-frequency domain signal to one or more harmonic multiple of the fundamental frequency, to generate an expanded voice source signal of the time-frequency domain signal; and combine the speech energy concentration with the expanded voice source signal to recreate original speech detected within the back EMF signal.

22. The system of claim 21, wherein to average the signal values, the processing device is further to average the signal values of the reduced-noise signal within the frequency window that exist over a time window comprising a subset of the plurality of time slots, and wherein the processing device is further to shift the time window across the plurality of time slots while shifting the frequency window across the plurality of frequencies to generate the plurality of complex frequency coefficients.

23. The system of claim 22, wherein to average the signal values, the processing device is further to normalize signal values, which exist at each frequency of the plurality of frequencies, as between zero ("0") and one ("1") across the time window, and wherein the time window is between 300 and 400 milliseconds.

24. The system of claim 21, wherein the processing device is further to zero out speech energy located outside of time-frequency areas of the speech energy concentration identified within the reduced-noise signal.

25. The system of claim 21, wherein the processing device is further to:

replicate the signal values at the fundamental frequency within the voiced data of the time-frequency domain signal to multiple harmonic frequencies of the fundamental frequency;

identify unvoiced data within the time-frequency domain signal; and replicate the unvoiced data to a plurality of higher frequencies to complete the expanded voice source signal.

26. The system of claim 21, wherein, to combine the speech energy concentration with the expanded voice source signal, the processing device is to:

apply an exponential decay function to data of the expanded voice source signal located along the one or more harmonic multiple of the fundamental frequency to generate a modified voice source signal;

apply the speech energy concentration as an energy mask to the modified voice source signal, to generate a resultant time-frequency domain signal;

apply a deferred spectral subtraction of background noise to the resultant time-frequency domain signal, to generate a resultant reduced-noise signal; and convert the resultant reduced-noise signal to the time frequency domain to recreate the original speech.

* * * * *